US011848904B2

(12) United States Patent
Monroe, II et al.

(10) Patent No.: US 11,848,904 B2
(45) Date of Patent: *Dec. 19, 2023

(54) SHARING CUSTOM HISTORY IN MULTI-PARTY DIRECT MESSAGE

(71) Applicant: Salesforce, Inc., San Francisco, CA (US)

(72) Inventors: Bradford Parker Monroe, II, Washington, DC (US); Kevin Van, Booklyn, NY (US); Ambrose Wing-Hei Li, Burnaby (CA); Elizabeth Clemenson, San Francisco, CA (US); Ittai Sean Barzilay, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,328

(22) Filed: Apr. 20, 2022

(65) Prior Publication Data
US 2023/0344788 A1 Oct. 26, 2023

(51) Int. Cl.
*H04L 51/216* (2022.01)
(52) U.S. Cl.
CPC ................. *H04L 51/216* (2022.05)
(58) Field of Classification Search
CPC .................................................. H04L 51/216
See application file for complete search history.

(56) References Cited

U.S. PATENT DOCUMENTS

| 10,021,059 B1 | 7/2018 | Rao |
| 10,805,247 B1 | 10/2020 | Cohen et al. |
| 2007/0288560 A1* | 12/2007 | Bou-Ghannam ... H04L 12/1822 709/204 |
| 2008/0080679 A1* | 4/2008 | Fernandez ............. H04L 51/04 379/88.17 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: < URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Le H Luu
(74) *Attorney, Agent, or Firm* — Lee & Hayes, P.C.

(57) ABSTRACT

Modifying direct message (DM) communication membership is described. A communication platform can receive, in association with a DM communication and from a user computing device of a user of a first group of users, a first request to modify the first group of users. The communication platform can send a second request to designate whether to include context data associated with the DM communication in a new or existing DM communication. Based on receiving an indication to include at least a portion of the context data associated with the DM communication in the new or existing DM communication, the communication platform can generate the new DM communication, wherein the new DM communication is associated with a second group of users different than the first group of users, and at least the portion of the context data is associated with the new DM communication.

20 Claims, 8 Drawing Sheets

(56) References Cited

U.S. PATENT DOCUMENTS

| | | | | |
|---|---|---|---|---|
| 2013/0246525 | A1* | 9/2013 | Patil | H04L 12/1827 709/204 |
| 2016/0284031 | A1 | 9/2016 | Quon et al. | |
| 2017/0195374 | A1 | 7/2017 | Vu et al. | |
| 2017/0323086 | A1 | 11/2017 | Lopez-Uricoechea et al. | |
| 2018/0287982 | A1 | 10/2018 | Draeger et al. | |
| 2019/0068390 | A1 | 2/2019 | Gross et al. | |
| 2019/0356700 | A1* | 11/2019 | Suhail | G06Q 10/10 |
| 2020/0274841 | A1* | 8/2020 | Lee | H04L 12/185 |
| 2021/0044551 | A1 | 2/2021 | Cohen et al. | |
| 2021/0117213 | A1 | 4/2021 | Chen et al. | |
| 2022/0070013 | A1 | 3/2022 | Barzilay et al. | |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516> (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/ #7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/? context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000) pp. 154-161.

Office Action for U.S. Appl. No. 17/003,264, dated Nov. 12, 2021, Barzilay, "Modifying Direct Message Communication Membership", 12 Pages.

Office Action for U.S. Appl. No. 17/003,264, dated Dec. 30, 2020, Barzilay, "Modifying Direct Message Communication Membership", 11 Pages.

Office Action for U.S. Appl. No. 17/003,264, dated Mar. 25, 2022, Barzilay, "Modifying Direct Message Communication Membership", 14 pages.

Office Action for U.S. Appl. No. 17/003,264, dated May 27, 2021, Brazilay, "Modifying Direct Message Communication Membership", 13 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

SHARING CUSTOM HISTORY IN MULTI-PARTY DIRECT MESSAGE

TECHNICAL FIELD

A communication platform can leverage a network-based computing system to enable users to exchange data. In some examples, users of the communication platform may communicate with other users of the communication platform via direct message (DM) communications, channels, and/or other virtual spaces. A DM, a channel, and/or another virtual space may include one or more data routes used for exchanging data between and among systems and devices associated with the communication platform. For example, a DM communication may be established between and among two or more user computing devices, allowing the two or more user computing devices to communicate and share data between and among each other over one or more networks (e.g., via the communication platform).

In some examples, data associated with a channel, a direct message, and/or other virtual space can be presented via a user interface. The data can include message objects, such as text, file attachments, emojis, and/or the like that are each posted by individual users of the communication platform. Users are then able to use features of the user interface in order to better communicate using the communication platform.

BRIEF DESCRIPTION OF THE DRAWINGS

The detailed description is described with reference to the accompanying figures. In the figures, the left-most digit of a reference number identifies the figure in which the reference number first appears. The use of the same reference number in different figures indicates similar or identical components or features. The figures are not drawn to scale.

DETAILED DESCRIPTION

Figure 1:
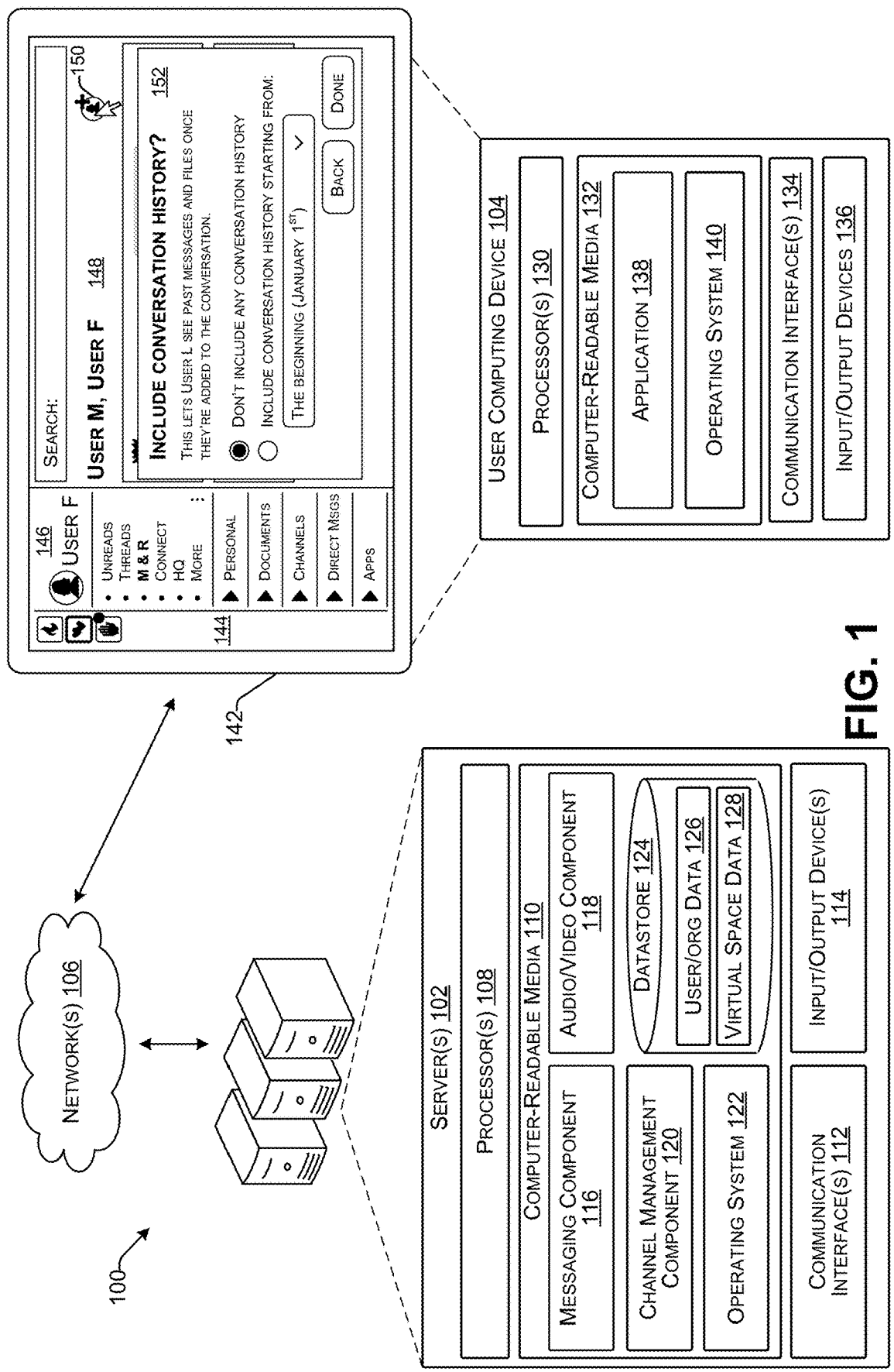
FIG. 1 illustrates an example environment for performing techniques described herein.

A communication platform may offer different types of virtual spaces for users of the communication platform to communicate between and among each other. In some examples, two or more users may communicate via a direct message (DM) communication. In other examples, two or more users may communicate via a communication channel, which may be referred to herein as a "channel." In some examples, a DM communication between two or more users may evolve such that the two or more users may desire to bring another user into the DM communication. Thus, an existing user associated with a DM communication (who may be referred to as a "member" of the DM), may "add" a new member to the DM communication by either locating an existing channel with the desired users or "converting" the DM communication into a new DM communication. This new DM communication may be a type of DM communication referred to as a multi-party direct message (MPDM) communication, which may contain three or more users. However, existing techniques for adding a new member to a DM is not without limitations. For example, the generation of a new DM communication may include limitations on whether messages or other data associated with the previous DM communication is associated with the new DM communication. As such, the techniques described herein are directed to "transferring" previous conversation history data associated with a previous DM communication (e.g., a source DM communication or a source MPDM communication) to a new or existing DM communication, such as MPDM communication (e.g., a destination MPDM communication). That is, the techniques described herein are directed to identifying an existing channel or generating a new DM communication based at least in part on a DM communication and transferring previous messages and other data, allowing newly added users to see the conversation that prompted their addition to the new DM.

As described above, conversations often grow and necessitate the addition and/or removal of other users to/from the conversation. In the case of email communications, adding users to an email communication is easy—a user may add an email address as a recipient and by "replying all," a newly added user can be included in all future email communications. Further, by adding the user as a recipient to an email, the user is able to access previous emails associated with the same conversation to understand the conversation. In some examples, users associated with the communication platform described herein can be added and/or removed from virtual spaces offered by the communication platform. In at least one example, as described above, users can be added to DMs by the generation of a new DM communication or identification of an existing communication containing the desired users. However, while the new DM communication may contain proper membership, the new DM communication may present limitations on whether messages or other data associated with the previous DM communication is associated with the new DM communication. As such, newly added users may be left in the dark on critical conversation that required their participation in the new DM communicating.

Techniques described herein are directed to modifications of memberships and communication history data in DM communications. For instance, in at least one example, techniques described herein are directed to the addition of users to a conversation to enable users to expand the audience of their conversation and to choose which previous messages to share with the additional users. For example, a user associated with a DM communication may interact with a user interface associated with the communication platform to request to add an additional user to the DM (or MPDM) communication. In such an example, the communication platform (e.g., via computing device(s) associated therewith) may request the user to identify the additional user to be added and to designate (i) whether to include context data from the DM communication in a new or existing DM communication and/or (ii) an amount of context data from the DM communication to include in the new DM communication.

For the purpose of this discussion, "context data," also referred to herein as "message history data," may be data that is associated with the DM communication that is representative of previous communications between the users associated with the DM communication. In some examples, context data can include messages, files (e.g., documents, images, etc.), links, emojis, reactjis, calls, and/or the like that can be associated with the DM communication. In some examples, context data can be associated with a date stamp, time stamp, indication of a user who added a data item to the DM communication, or the like. In at least one example, the "context data" can comprise the conversational history associated with the DM communication.

In some examples, the user can designate (i) whether to include context data from the DM communication in a new MPDM communication and/or (ii) an amount of context data from the DM communication to include in the new MPDM communication, and based at least in part on receiving an indication of (i) whether to include context data from the DM communication in a new or existing DM communication and/or (ii) an amount of context data from the DM communication to include in the new MPDM communication, the communication platform can generate a new MPDM communication that includes the users previously associated with the DM communication and the additional user. In response to receiving an indication to include context data, the communication platform may associate such context data with the new MPDM communication. As such, the newly added user may view context data to understand the conversation that prompted the addition of the newly added user to the conversation. The newly added user and users that were previously associated with the DM communication may exchange data and carry on the conversation via the newly created MPDM communication. The newly added user and the users that were previously associated with the DM communication are thus "members" of the new MPDM communication.

In some examples, a previously created DM communication may already exist in which the desired users are members. Rather than creating a new MPDM communication, the communication platform may, in response to identifying the existing MPDM communication, present, to the user requesting to add an additional user, options to (i) use the existing MPDM communication and/or (ii) generate a new MPDM communication. Similar to that described above with respect to a new MPDM communication, in the example where the user designates to use the existing MPDM communication, the user may then designate (i) whether to include context data from the DM communication in the existing MPDM communication and/or (ii) an amount of context data from the DM communication to include in the existing MPDM communication, and based at least in part on receiving an indication of (i) whether to include context data from the DM communication in the existing MPDM communication and/or (ii) an amount of context data from the DM communication to include in the existing MPDM communication, the communication platform can transfer the identified context data to the existing MPDM communication.

In some examples, the transfer of context data may still enable users of the original DM communication to interact with one another. For example, the users of the original DM communication may still access and use the original DM communication, As described above, techniques described herein enable users to add additional users to their conversations via a streamlined, efficient process that minimizes interaction required of the users. Techniques described herein therefore provide for a faster "conversion" process (i.e., "converting" a DM communication to a new MPDM communication). Furthermore, techniques described herein provide users with control on how much context data is shared with newly added users. This can enable users to share portion(s) of previous conversations without sharing all of their previous conversations (which may or may not be relevant to the newly added user), providing both privacy and security for users of the communication platform. As such, techniques described herein provide improvements to existing computing processes by streamlining the addition of users from DM communications. Additional details and examples are described below with reference to FIGS. 1-7.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a channel management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a time stamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the messaging component 116 can establish a DM communication between and among various user computing devices, allowing the user computing devices to communicate and share data between and among each other. In at least one example, users associated with a DM communication can be "members" of the DM communication, as described above. In some examples, a DM communication can be a private conversation such that contents of the communication are not searchable or viewable by other users and/or a user may be invited to join. In some examples, a DM communication can be between users associated with a same group (e.g., workspace, organization). In some examples, a DM communication can be between users associated with different groups (e.g., workspaces, organizations). That is, in some examples, a DM communication can be associated with a first user associated with a first workspace and/or organization and at least a second user associated with a second workspace and/or organization that can be different than the first workspace and/or organization. In some examples, users associated with a DM communication can be associated with the same permission(s) or different permission(s). In the case of different permission(s), a first user can be associated with one or more first permissions and a second user can be associated with one or more second permissions.

In at least one example, the messaging component 116 can manage DM communications and/or sharing of data via DM communications. For example, in at least one example, the messaging component 116 can receive a request to generate a DM communication. In some examples, the request can include one or more users to invite to join the DM communication, and/or permissions associated with the DM communication. In some examples, the user(s) can be associated with a same group as the requesting user or a different group. For example, in some examples, one or more of the user(s) can be associated with a different group such that the DM communication can be "externally" shared. In such an example, a user associated with a first organization (or the host organization) can invite a user associated with a second organization (or the invited organization) to join a DM communication. A resulting DM communication can be called a "shared DM communication" or an "externally shared DM communication."

DM communications can be associated with features, some of which can be determined by permissions. Such permissions can indicate whether members can leave a DM communication, whether additional users can be added to a DM communication, whether users can be removed from a DM communication, whether guest users (e.g., a single channel guest user who is a member of a single channel with limited functionality) can be added to a DM communication or whether the guest user can add others to a DM communication, whether external users (e.g., associated with a different workspace, different organization, etc.) can join a DM communication, whether DM communications are discoverable, where DM communications are discoverable (e.g., in a people search, DM browser, linked within a message, etc.), whether a DM communication can be renamed and/or associated with a topic, purpose, or other details, and/or the like. In at least one example, the permissions can indicate that users who are associated with a DM communication (i.e., "members") can access and/or otherwise interact with data associated with the DM communication and users who are not associated with a DM communication, may not access and/or otherwise interact with data associated with the DM communication. In some examples, a user may post files or images but another user without permission(s) (e.g., with different permission(s)) cannot. In some examples, the data retention of messages from users with certain permission(s) may be longer than users with different permission(s). In at least one example, users can be "added" or "removed" from a DM communication, via techniques described herein.

For example, in at least one example, a user associated with a DM communication can interact with a user interface presented via the user computing device 104 to request to add another user to the DM communication. For privacy and security purposes, the messaging component 116 may not be able to add the user to the DM communication (e.g., as defined by permissions associated with the DM communication). Instead, in at least one example, the messaging component 116, via the channel management component 120, may generate a new DM communication, wherein the members of the DM communication and the to-be-added user are members of the new DM communication. In such an example, the messaging component 116 can receive a request to add a user to a DM communication and can send a request back to the user computing device 104, prompting the user to identify the user(s) to be added and, in some examples, designate (i) whether to include context data from the DM communication in a (to be generated) new DM communication and/or (ii) an amount of context data from the DM communication to include in the new DM communication. Such a request (e.g., from the messaging component 116) can cause a user interface element to be presented via a user interface associated with the communication platform on a user computing device of the requesting user. Examples of such a user interface and user interface element are described below.

In some examples, the user can interact with the user interface and/or user interface element to provide identifier(s) associated with user(s) to be added (e.g., mentions, userID, email address, etc.) and, in some examples, designate (i) whether to include context data from the DM communication in a new DM communication and/or (ii) an amount of context data from the DM communication to include in the new DM communication. The user computing device 104 can send the identifier(s) and, in some examples, an indication of such designation(s) to the server(s) 102 and the messaging component 116 can receive such information. In at least one example, based at least in part on receiving the identifier(s) and, in some examples, an indication of (i) whether to include context data from the DM communication in a new DM communication and/or (ii) an amount of context data from the DM communication to include in the new DM communication, the messaging component 116 can cause a new DM communication to be generated (e.g., by the channel management component 120). In at least one example, the new DM communication can include the users previously associated with the DM communication and the newly added user(s) (e.g., as identified from the identifier(s) provided). If the messaging component 116 receives an indication to include context data, and/or an amount of context data to include, the messaging component 116 can cause such context data to be associated with the new DM communication. As such, the newly added user(s) can view context data to understand the conversation that prompted the addition of the newly added user(s) to the conversation. In at least one example, the newly added user(s) and the users that were previously associated with the DM communication can exchange data and carry on the conversation via the newly created channel. The newly added user(s) and the users that were previously associated with the DM communication can be "members" of the new DM communication.

Members can be removed from DM communications via a similar process as described above. For example, in at least one example, a user associated with a DM communication can interact with a user interface presented via the user computing device 104 to request to remove a user from the DM communication. For privacy and security purposes, the messaging component 116 may not be able to remove the user from the DM communication. Instead, in at least one example, the messaging component 116 may generate a new DM communication, via the channel management component 120, wherein members of the new DM communication comprise members that have not been removed and/or requested to be removed. In at least one example, the messaging component 116 can receive a request to remove a user from a DM communication and can send a request back to the user computing device 104, requesting the user to identify which user(s) to remove (e.g., by providing an identifier associated therewith) and, in some examples, designate (i) whether to include context data from the DM communication in a (to be generated) new DM communication and/or (ii) an amount of context data from the DM communication to include in the new DM communication.

In some examples, the user can interact with the user interface and/or user interface element to provide identifier(s) associated with user(s) to be removed (e.g., mentions, userID, email address, etc.) and, in some examples, designate (i) whether to include context data from the DM communication in a new DM communication and/or (ii) an amount of context data from the DM communication to include in the new DM communication. The user computing device 104 can send the identifier(s) and, in some examples, an indication of such designation(s) to the server(s) 102 and the messaging component 116 can receive such information. In at least one example, based at least in part on receiving the identifier(s) and, in some examples, an indication of (i) whether to include context data from the DM communication in a new DM communication and/or (ii) an amount of context data from the DM communication to include in the new DM communication, the messaging component 116 can cause a new DM communication to be generated (e.g., by the channel management component 120). In at least one example, the new DM communication can include the users previously associated with the DM communication, except for the user(s) that was/were removed (e.g., as determined by the identifier(s) received). If the messaging component 116 receives an indication to include context data, and/or an amount of context data to include, the messaging component 116 can cause such context data to be associated with the new DM communication. As such, the remaining members (e.g., the users who were not removed) can exchange data and carry on the conversation via the newly created communication.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the channel management component 120 can manage channels. As described above, in at least one example, the communication platform can be a channel-based messaging platform, that in some examples, can be usable by group(s) of users. As described above, each group can be associated with a group identifier (e.g., organization identifier, workspace identifier) and one or more user accounts can be mapped to, or otherwise associated with, the group identifier. User(s) corresponding to such user account(s) can be "members" of the group.

In at least one example, users of the communication platform can communicate with other users via channels. A channel can be a virtual space and/or data route used for exchanging data between and among systems and devices associated with the communication platform. In at least one example, the channel management component 120 can establish a channel between and among various user computing devices, allowing the user computing devices to communicate and share data between and among each other. In at least one example, users who subscribe to updates associated with a channel and/or have permission to view, share, and/or interact with data associated with a channel can be referred to as "members" of the channel. In at least one example, the channel management component 120 can manage channel communications and/or sharing of data via channels.

In some examples, channels may be a DM communication and/or a MPDM communication. As described above, in at least one example, two or more users can communicate with one another via a DM communication. A DM communication can be a virtual space and/or data route used for exchanging data between and among two or more systems and devices associated with two or more users of the communication platform. For example, a DM communication may be established between and among two or more user computing devices, allowing the two or more user computing devices to communicate and share data between and among each other over the network(s) 106 (e.g., via the communication platform). Additionally or alternatively, a channel may be a type of DM communication referred to as a MPDM communication. For the purposes of this application, the term MPDM may be used interchangeably with a DM communication. Similar to a DM communication, a MPDM communication can be a virtual space and/or data route. However, a MPDM communication may include three or more users, while a DM communication may include two or more users.

In some examples, a MPDM communication may be generated based in part on a DM communication. For example, based at least in part on receiving a request from a user to add an additional user to a DM communication consisting of two users, the communication platform may generate a new MPDM communication, the new MPDM communication consisting of at least the two existing users and the additional user. Similarly, a DM communication may be generated based at least in part on an existing MPDM communication. For example, based at least in part on receiving a request from an existing user to remove a user from MPDM communication, the communication platform may generate a new MPDM communication and/or DM communication consisting of the users associated with the original MPDM, while excluding the removed user. In some examples, in response to generating the new MPDM communication and/or the DM communication, the communication platform may delete the original MPDM communication, preventing the original users of the MPDM communication from further communicating via the original MPDM communication.

In some examples, an additional user may be added "in place" to a DM communication and/or a MPDM communication without the communication system creating a new DM communication and/or a MPDM communication. For example, based at least in part on receiving a request from an existing user to add an additional user to a DM communication and/or a MPDM communication, the communication platform may simply add the additional user to the existing communication. In some examples, based at least in part on receiving the request to add the additional user, the communication platform may request the existing user to identify the additional user to be added and to designate (i) whether to include context data from the DM communication and/or the MPDM communication in a new or existing channel and/or (ii) an amount of context data from the DM communication and/or the MPDM communication to include in the new DM communication.

In some examples, a channel may be "public," which may allow any user within a group (e.g., associated with an organization identifier, associated with a workspace identifier, etc.) to join and participate in the data sharing through the channel. In at least one example, any full member of a public channel can view and/or interact with context data associated with the public channel (e.g., history), add and/or remove members, and/or otherwise interact with the public channel. Public channels can be discoverable for users associated with a same group or who otherwise have permission to join. In some examples, a channel may be "private," which may restrict data communications in the channel to certain users or users having particular roles (e.g., managers, administrators, etc.) and/or types (e.g., verified, etc.). In some examples, private channels may not be discoverable by users who are not members of the private channels and users who are not members of the private channels may not be permitted to view or interact with data associated therewith. In at least one example, users who are members of a channel—private or public—can add or remove members, so long as such users have permission to do so (e.g., as defined by channel permissions and/or individual user permissions). Similarly, a DM or MPDM can be considered to be a private communication or a private conversation, where the above restrictions may apply.

In some examples, a channel may be "shared," which may allow users associated with two or more different groups (e.g., entities associated with two or more different organization and/or workspace identifiers) to join and participate in the data sharing through the channel. Shared channels may be public such that they are accessible to any user of either group, or they may be private such that they are restricted to access by certain users or users having particular roles and/or types.

In at least one example, the channel management component 120 can receive a request to generate a channel. In some examples, the request can include a name that is to be associated with the channel, one or more users to invite to join the channel, and/or permissions associated with the channel. In some examples, the user(s) can be associated with a same group as the requesting group or a different group. For example, in some examples, one or more of the user(s) can be associated with a different group such that the channel can be "externally" shared. As described above, in at least one example, a first organization (or the host organization) can invite a second organization (or the invited organization) to join a channel. A resulting channel can be called a "shared channel" or an "externally shared channel." In some examples, an administrator or other user associated with the first organization can invite new members in the first organization or the second organization via a mention, a profile view, an email, or generating a link from a user interface associated with the channel that enables users to be added to the channel.

In some examples, channels can be associated with features, some of which can be determined by permissions. Such permissions can indicate whether members can leave a channel, whether additional users can be added to a channel, whether users can be removed from a channel, whether guest users can be added to a channel, whether external users (e.g., associated with a different workspace, different organization, etc.) can join a channel, whether channels are discoverable, where channels are discoverable (e.g., in a people search, channel search, channel browser, linked within a message, etc.), whether a channel can be renamed and/or associated with a topic, purpose, or other details, and/or the like. In at least one example, the permissions can indicate that users who are associated with a channel (i.e., "members") can access and/or otherwise interact with data associated with the channel and users who are not associated with a channel, may not access and/or otherwise interact with data associated with the channel. In some examples, a user can preview data associated with a channel, but may not be able to interact with such data if the user is not associated with the channel.

In at least one example, the channel management component 120 can generate new DM communications based at least in part on instructions received from the messaging component 116, described above.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below with reference to FIG. 2.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein (e.g., the DM communication between users M and F). In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. Additional details associated with the user interface 142, and the third region 148, are described below with reference to FIG. 2.

In at least one example, the user interface 142 can include a user interface element 150 that can be selectable such that, when selected or otherwise actuated, can cause the application 138 to present another user interface element 152. In FIG. 1, the user interface element 152 is presented as a pop-up, but in additional or alternative examples, the user interface element 152 can be presented as an overlay, an additional user interface, or the like. In at least one example, the user interface element 152 can include an input mechanism to enable a user to identify which user(s) to add to (or remove from) the DM communication. In some examples, the user interface element 152 can include options for the user to designate (i) whether to include context data from the DM communication in a new DM communication and/or (ii) an amount of context data from the DM communication to include in the new DM communication. Additional details are described below with reference to FIGS. 2A-B and 3.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the channel management component 120, and the application 138, techniques described herein can be performed by any other component, or combination of components, which can be associated with the server(s) 102, the user computing device 104, or a combination thereof.

Figure 2A:
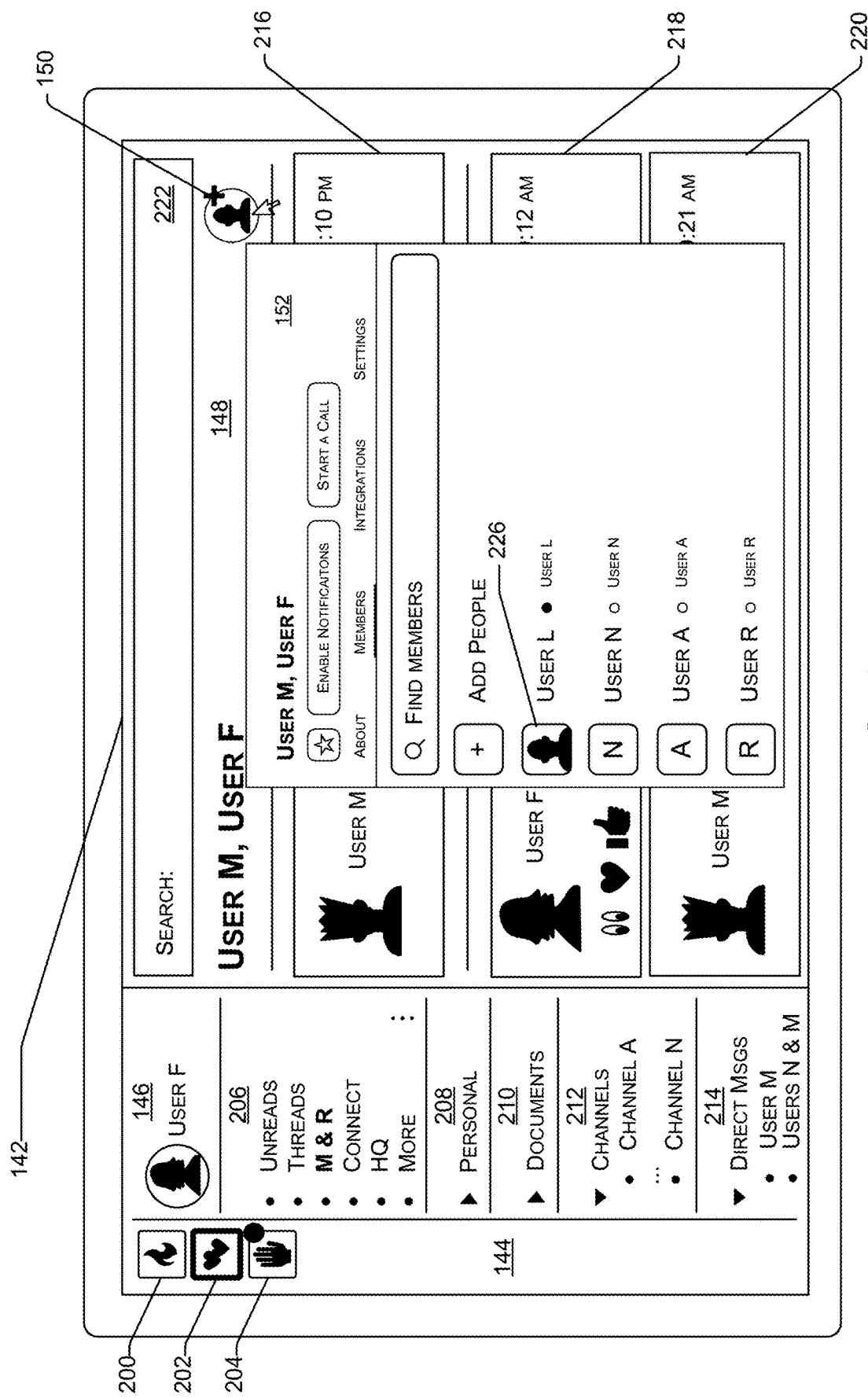
FIG. 2A illustrates an example user interface associated with adding an additional user to a direct message (DM) communication, as described herein.
Figure 2B:
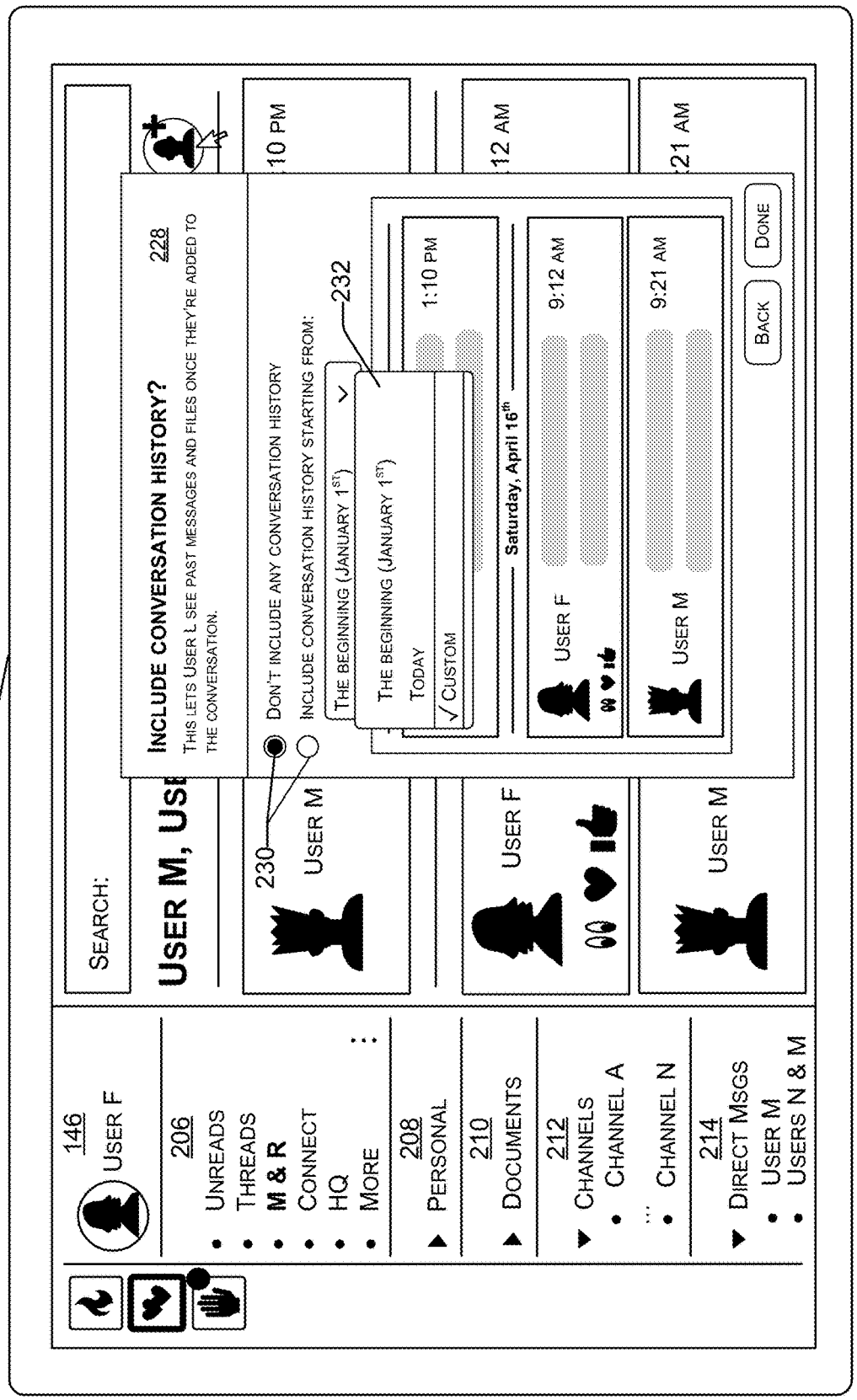
FIG. 2B illustrates another example of the user interface described in FIG. 2A associated with determining context data to be associated with a new DM communication, as described herein.

FIGS. 2A and 2B illustrate additional details associated with the user interface 142 and the user interface element 152 usable for generating a new DM communication based at least in part on a DM communication and transferring context data from the DM communication to the new DM communication, as described above with reference to FIG. 1.

As described above, in at least one example, the user interface 142 can include a first region 144, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 144. In at least one example, a user account of the user (e.g., User F) can be associated with group identifiers that correspond to each of the workspaces (e.g., as determined by the user/org data 126 and/or the virtual space data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIGS. 2A and 2B, the user can be associated with any number of workspaces. In some examples, indicators associated with all of the workspaces with which a user is associated can be presented via the first region 144. In some examples, some of the indicators associated with all of the workspaces with which a user is associated can be presented via the first region 144 and the user can interact with the user interface 142 to view additional or alternative indicators. In examples where fewer than all workspaces are represented via the user interface 142, the indicators can be arranged in alphabetical order, in an order of most recent interaction, in an order based on most frequent interaction, or some other order.

In some examples, the first region 144 may not be included in the user interface 142, and such information can be integrated into the user interface 142 via additional or alternative mechanisms.

In some examples, the user interface 142 can include a second region 146, or pane, that includes indicator(s) (e.g., user interface element(s) or object(s)) representing virtual space(s) associated with the workspace(s) with which the user (e.g., account of the user) is associated. In at least one example, the second region 146 can represent a sidebar of the user interface 142. In at least one example, the second region 146 can include one or more sub-sections, or sub-panes, which can represent different virtual spaces. For example, a first sub-section 206 can include indicators representing virtual spaces that can aggregate data associated with a plurality of virtual spaces of which the user is a member. In at least one example, each virtual space can be associated with an indicator in the first sub-section 206. In some examples, an indicator can be associated with an actuation mechanism (e.g., affordance) such that when actuated, can cause the application 138 to present data associated with the corresponding virtual space via the third region 148. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 148, for example in a feed. In such examples, different types of events and/or actions, which can be associated with different virtual spaces, can be presented via a same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with a same type of event and/or action. For example, "threads" can be associated with messages, files, etc. posted in threads to messages posted in a virtual space and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different virtual spaces, can be presented via a same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented in the third region 148.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 142 (e.g., in the third region 148). In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be sharable via another virtual space, such that data associated with the canvas is accessible to and/or rendered interactable for members of the virtual space.

In some examples, if the first sub-section 206 includes a user interface element representative of a virtual space associated with audio and/or video communications (e.g., conversations, multimedia clips (e.g., videos, audio files, stories, etc.), that is actuated by a user, audio and/or video data associated with the user, which can be associated with different audio and/or video conversations, multimedia clips, stories, and/or the like, can be presented via the third region 148. In some examples, such audio and/or video data can be presented via a feed. For the purpose of this discussion, audio and/or video data can correspond to audio and/or video content provided by a user associated with the communication platform.

In at least one example, the second region 146 of the user interface 142 can include a second sub-section 208, or sub-pane, that is a personalized sub-section associated with personal documents that are associated with the user account. In at least one example, the user can select personal documents to associate with the second sub-section 208, such as by dragging and dropping, pinning, or otherwise associating selected personal documents into the second sub-section 208. As discussed above, personal documents can include collaborative documents in which the user is a sole member. For example, a personal document can include a to do list, a document with saved items, and/or the like.

In at least one example, the second region 146 of the user interface 142 can include a third sub-section 210, or sub-pane, or sub-pane, associated with collaborative documents that are associated with the user account of the user. That is, a "documents" sub-section can include affordances associated with one or more collaborative documents of which the user is a member. In various examples, the communication platform can determine one or more collaborative documents to be associated with the documents sub-section (e.g., third sub-section 210) based on one or more ranking criteria. That is, the communication platform can cause affordances associated with highest ranking collaborative documents of which the user is a member to be presented in the documents sub-section. In some examples, the user can pin or otherwise associate one or more collaborative documents with the third sub-section 210. For example, the user can drag an affordance or other indicator associated with a collaborative document to the third sub-section 210 and release the selected collaborative document therein. In response to the drag-and-drop action, the communication platform can associate the selected collaborative document with the third sub-section 210 and cause presentation of an affordance of the selected collaborative document therein.

In at least one example, a label or other indicator associated with the third sub-section 210 can include an affordance that, when selected by the user, causes a documents interface to be presented in the third region 148 of the user interface 142. In some examples, the documents interface can include one or more lists of collaborative document(s) with which the user account of the user is associated. For example, the documents interface can include a first list of personal collaborative documents associated with the user account and a second list of collaborative documents that include two or more members.

In at least one example, the second region 146 of the user interface 142 can include a fourth sub-section 212, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the fourth sub-section 212 can depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the fourth sub-section 212 can depict all communication channels, or a subset of all communication channels, that the user is a member of, and the user can interact with the user interface 142 to browse or view other communication channels that the user is not a member of but are not currently displayed in the fourth sub-section 212. In some examples, different types of communication channels (e.g., public, private, shared, cross-workspace, etc.) can be in different sections of the fourth sub-section 212, or can have their own sub-regions or sub-panes in the user interface 142. In some examples, communication channels associated with different workspaces can be in different sections of the fourth sub-section 212, or can have their own regions or panes in the user interface 142.

In some examples, the indicators can be associated with graphical elements that visually differentiate types of communication channels. For example, Channel A is associated with a lock graphical element. As a non-limiting example, and for the purpose of this discussion, the lock graphical element can indicate that the associated communication channel, Channel A, is private and access thereto is limited, whereas another communication channel, Channel N, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the second region 146 can include a fifth sub-section 214, or sub-pane, that can include indicators representative of communications with individual users or multiple specified users (e.g., instead of all, or a subset of, members of an organization). Such communications can be referred to as "direct messages." That is, the fifth sub-section 214, or sub-pane, can include indicators representative of virtual spaces that are associated with private messages between one or more users.

Additionally, though not illustrated, the second region 146 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

As described above, in at least one example, the user interface 142 can include a third region 148, or pane, that is associated with a feed indicating messages posted to and/or actions taken with respect to a virtual space (e.g., a virtual space associated with direct message communication(s), a virtual space associated with communication channel communication(s), a virtual space associated with collaborative document communication(s) (e.g., via a messaging or chat interface within a collaborative document), a virtual space associated with audio and/or video communications, etc.) for facilitating communications. As described above, in at least one example, data associated with the third region 148 can be associated with the same or different workspaces. That is, in some examples, the third region 148 can present data associated with the same or different workspaces via an integrated feed. In some examples, the data can be organized and/or is sortable by time, type of action, virtual space, user, or the like. In some examples, such data can be associated with an indication of which user posted the message and/or performed an action. In examples where the third region 148 presents data associated with multiple workspaces or other virtual spaces, at least some data can be associated with an indication of which workspace or other virtual space the data is associated with.

For example, in FIG. 2A, the user (e.g., User F), can interact with the user interface 142 to view data associated with the virtual space corresponding to a DM communication with User M. In FIG. 2A, data associated with the virtual space can be associated with different communication channels and different workspaces. In some examples, although not illustrated, the data may be organized by communication channel. Though this is not intended to be so limiting, and the data can be organized and/or sortable by virtual space, time, type of action, user, and/or the like. As illustrated, another user (e.g., User M) posted two messages, represented by the indicators 216 and 220 (e.g., a user interface element, object, etc.), which is associated with a communication channel. The user (e.g., User F) also posted a message, represented by the indicator 218 (e.g., a user interface element, object, etc.), in the same communication channel. One or more other users reacted to the message, represented by the indicator 218, with an emoji. As such, indicators associated with both messages can be presented in the third region 148. Because the data is organized by virtual space, indicators associated with both messages are presented together. In at least one example, the communication channel can be associated with the second workspace (e.g., associated with the second indicator 202). In some examples, because the user is currently interacting with (or most recently interacted with) the second workspace, neither of the indicators 216 or 218 are associated with workspace indicators (e.g., the second indicator 202).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 148 of the user interface 142 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 148 can comprise a feed associated with a single virtual space. In such examples, data associated with the virtual space can be presented via the feed. In at least one example, data associated with a virtual space can be viewable to at least some of the users of a group of users associated with a same group identifier, such as users with appropriate permissions to access the virtual space. In some examples, for members of a virtual space, the content of the virtual space (e.g., messaging communications) can be displayed to each member of the virtual space. For instance, a common set of group-based messaging communications can be displayed to each member of the virtual space such that the content of the virtual space (e.g., messaging communications) may not vary per member of the virtual space. In some examples, data associated with a virtual space can appear differently for different users (e.g., based on personal configurations, group membership, etc.).

In at least one example, the format of the individual virtual spaces may appear differently to different users. In some examples, the format of the individual virtual spaces may appear differently based on which workspace a user is currently interacting with or most recently interacted with. In some examples, the format of the individual virtual spaces may appear differently for different users (e.g., based on personal configurations, group membership, etc.).

In at least one example, the user interface 142 can include a search mechanism 222, wherein a user can input a search term and the server(s) 102 can perform a search associated with the communication platform. In some examples, the search can be performed across each workspace with which the user is associated, or the search can be restricted to a particular workspace, based on a user specification.

The user interface 142 is a non-limiting example of a user interface that can be presented via the user computing device 104 (e.g., by the application 138). In some examples, the application 138 can receive data from the messaging component 116, the audio/video component 118, and/or the channel management component 120 and the application 138 can generate and present the user interface 142 based on the data. In other examples, the application 138 can receive data from the messaging component 116 and/or the audio/video component 118, and instructions for generating the user interface 142 from the messaging component 116, the audio/video component 118, and/or the channel management component 120. In such an example, the application 138 can present the user interface 142 based on the instructions. Additional or alternative data can be presented via a user interface and additional or alternative configurations can be imagined.

As described above, in FIG. 2A, the second region 148 is associated with a DM communication feed associated with a DM communication (e.g., the DM between Users M and F). In at least one example, the user interface 142 can include user interface element 150 that can be selectable such that, when selected or otherwise actuated, can cause the application 138 to present another user interface element 152. In at least one example, the application 138 can detect the selection, or other actuation, and can send an indication of such to the server(s) 102. The messaging component 116 can send an instruction to cause the user interface 152 to be presented. In some examples, such an instruction can be associated with a "request" for information that can be provided via the user interface element 152. In FIG. 2A, the user interface element 152 is presented as a pop-up, but in additional or alternative examples, the user interface element 152 can be presented as an overlay, an additional user interface, or the like.

In at least one example, the user interface element 152 can include an input mechanism to enable a user to identify which user(s) to add to the DM communication. In some examples, the user can input an identifier of another user to be added to the DM communication. Such an identifier can be a mention, a userID, an email address, or the like. Additionally or alternatively, the user interface element 152 may include one or more recommended users illustrated as selectable icons, such as User L selectable control 226 such that one or more additional users may easily and quickly be identified. While illustrated as a scrollable list in FIG. 2A, user options can be selected using checkboxes, dropdown lists, list boxes, buttons, toggles, text fields, date fields, time fields, or the like. In at least one example, based at least in part on detecting an input associated with the user interface element 152, the application 138 can send an indication of the input(s) (e.g., identifier(s) provided, selection(s) regarding context data, etc.) to the server(s) 102 and the channel management component 120 can generate a new DM communication (via interactions with the messaging component 116). Additional details are provided below.

FIG. 2B illustrates an example of the user interface 142 after an additional user has been selected to be "added" to the new DM communication described above in FIG. 2A. As described above, in some examples, users may not be able to be added (or removed) from DM communications (e.g., due to permissions associated therewith). Instead, the messaging component 116 and/or the channel management component 120 can generate a new DM communication that can be associated with the users previously associated with the DM communication (e.g., User M and User F) and the additional user (e.g., User Z). Further, in at least one example, the new DM communication can be associated with at least some context data associated with the DM communication. That is, techniques described herein enable the "addition" of a user to a DM communication by generating a new DM communication (with an additional user added to the membership), a process that can be perceived as "converting" the DM communication to a new DM communication. Similarly, techniques described herein enable the "removal" of a user to a DM communication by generating a new DM communication (with user(s) removed from the membership), a process that can be perceived as "converting" the DM communication to a new DM communication. In other examples, additional users may be prevented from accessing previous conversation history which took place prior to their joining the DM communication. Thus, users adding an additional user may be presented one or more options associated with including previous conversation history data associated with the DM communication.

For example, based at least in part on receiving an input associated with the user interface element 152 to add an additional user to the DM communication, the application 138 may present another user interface element 228 usable to designate whether to include conversation history in a new DM communication. As described above, in some examples, a user can designate (i) whether to include context data from the DM communication in a new DM communication and/or (ii) an amount of context data to include. FIG. 2B illustrates the user interface 142 described above with reference to FIGS. 1 and 2A, wherein the user interface element 228 presented includes options for the user to designate (i) whether to exclude context data from the DM communication and/or (ii) whether to include context data from the DM communication in a new DM communication. The user interface element 228 presented further includes three options for the user to designate context data to include, as described in further detail below. The configuration and options illustrated in FIG. 2B are examples, and additional or alternative configurations and options are within the scope of this disclosure. For instance, as described above, the options can be selectable using checkboxes, dropdown lists, list boxes, buttons, toggles, text fields, date fields, time fields, or the like. Further, more or fewer options can be presented via the user interface element 228.

In some examples, an option presented via the user interface element 228 can enable all context data associated with a DM communication to be transferred to the new DM communication, indicated by the option "The Beginning (January 1$^{st}$)," indicating that the DM communication between User M and User F, depicted in user interface 142, began on January 1$^{st}$. In such examples, based at least in part on detecting a selection of a selectable control associated with such an option, the application 138 can send an indication of such to the messaging component 116, which can provide the indication to the channel management component 120. The channel management component 120 can associate all of the context data associated with the DM communication with the new DM communication. In at least one example, the channel management component 120 can "transfer" context data from the DM communication to the new DM communication by duplicating the context data in the DM communication and associating duplicated context data with the new DM communication, moving the context data from the DM communication to the new DM communication, or the like. That is, in some examples, the channel management component 120 can duplicate (e.g., copy) the context data and associate the duplicated context data with the new DM communication. In such an example, the context data can persist in the DM communication (and thus the DM communication can persist, too). In some examples, the channel management component 120 can move the context data from the DM communication to the new DM communication (e.g., copy the context data from the source to the destination and delete the context data from the source). In such examples, the DM communication may no longer exist.

In some examples, the user interface element 228 can enable a user to designate a date, such that context data associated with the DM communication on or after the date is to be associated with the new DM communication. In such examples, based at least in part on detecting a selection of a selectable control associated with such an option and/or the designated date, the application 138 can send an indication of such to the messaging component 116, which can provide the indication to the channel management component 120. The channel management component 120 can determine the portion of the context data to be associated with the new DM communication (e.g., based at least in part on such an indication) and can associate the portion of the context data with the new DM communication. That is, context data associated with the DM communication on or after the designated date can be associated with the new DM communication. As described above, in some examples, the channel management component 120 can duplicate (e.g., copy) the portion of the context data and associate the duplicated portion of the context data with the new DM communication. In such an example, the context data can persist in the DM communication. In some examples, the channel management component 120 can move the portion of the context data from the DM communication to the new DM communication. In some such examples, any context data that was not moved to the new DM communication can persist in the DM communication.

In some examples, the user interface element 228 can enable a user to designate a time, such that context data associated with the DM communication on or after the time is to be associated with the new DM communication. In such examples, based at least in part on detecting a selection of a selectable control associated with such an option and/or the designated time, the application 138 can send an indication of such to the messaging component 116, which can provide the indication to the channel management component 120. The channel management component 120 can determine the portion of the context data to be associated with the new DM communication (e.g., based at least in part on the indication) and can associate the portion of the context data with the new DM communication. That is, context data associated with the DM communication on or after the designated time can be associated with the new DM communication. In some examples, the channel management component 120 can duplicate (e.g., copy) the portion of the context data and associate the duplicated portion of the context data with the new DM communication. In such an example, the context data can persist in the DM communication. In some examples, the channel management component 120 can move the portion of the context data from the DM communication to the new DM communication. In some such examples, any context data that was not moved to the new DM communication can persist in the DM communication.

In some examples, the user interface element 228 can enable a user to designate a period of time, such that context data associated with the DM communication during the period of time is to be associated with the new DM communication. In such examples, based at least in part on detecting a selection of a selectable control associated with such an option and/or the designated period of time, the application 138 can send an indication of such to the messaging component 116, which can provide the indication to the channel management component 120. The channel management component 120 can determine the portion of the context data to be associated with the new DM communication (e.g., based at least in part on the indication) and can associate the portion of the context data with the new DM communication. That is, context data associated with the DM communication during the designated period of time can be associated with the new DM communication. In some examples, the channel management component 120 can duplicate (e.g., copy) the portion of the context data and associate the duplicated portion of the context data with the new DM communication. In such an example, the context data can persist in the DM communication. In some examples, the channel management component 120 can move the portion of the context data from the DM communication to the new DM communication. In some such examples, any context data that was not moved to the new DM communication can persist in the DM communication.

In some examples, the user interface element 228 can enable a user to designate a topic, such that context data associated with the DM communication associated with the topic is to be associated with the new DM communication. In such examples, based at least in part on detecting a selection of a selectable control associated with such an option and/or the designated topic, the application 138 can send an indication of such to the messaging component 116, which can provide the indication to the channel management component 120. The channel management component 120 can determine the portion of the context data to be associated with the new DM communication (e.g., based at least in part on the indication) and can associate the portion of the context data with the new DM communication. That is, context data associated with the DM communication associated with the designated topic can be associated with the new DM communication. In some examples, the channel management component 120 can duplicate (e.g., copy) the portion of the context data and associate the duplicated portion of the context data with the new DM communication. In such an example, the context data can persist in the DM communication. In some examples, the channel management component 120 can move the portion of the context data from the DM communication to the new DM communication. In some such examples, any context data that was not moved to the new DM communication can persist in the DM communication.

In some examples, the user interface element 152 can enable a user to designate particular message(s) or data that is to be associated with the new DM communication. In such examples, based at least in part on detecting a selection of a selectable control associated with such an option (indicated by the option "Custom" in FIG. 2B), the application 138 can send an indication of such to the messaging component 116, which can provide the indication to the channel management component 120. In some examples, the messaging component 116 can prompt the user to identify the particular message(s) or data via a user interface element 232. That is, a user can interact with the user interface 142 and/or the user interface element 228 to designate an amount of context data to be associated with a new DM communication by designating a characteristic with which at least a portion of the context data is associated. In some examples, the user interface element 228 may include at least a portion of the conversation history. For example, the user interface element 232 may be the same or similar to user interface 142 and may include at least a portion of the context data associated with the DM communication. In some examples, although not illustrated, the user may be presented with one or more options to individually select the message history data to include in the new DM communication. Although depicted in FIG. 2B as being displayed in chronological order, similar to that depicted in user interface 142, the application 138 may present one or more options to select message history data based at least in part on a user associated with the message history data, a period of time associated with the message history data, and a type of communication (e.g., a message, a reaction, a file, a conversation thread, etc.) associated with the message history data, to name a few non-limiting examples.

In some examples, the user can interact with the user interface element 232 and the application 138 can send an indication of the selected message(s) or data to the messaging component 116, which can provide the indication to the channel management component 120. The channel management component 120 can determine the portion of the context data to be associated with the new DM communication (e.g., the selected message(s) or data) and can associate the portion of the context data with the new DM communication. In some examples, the channel management component 120 can duplicate (e.g., copy) the portion of the context data and associate the duplicated portion of the context data with the new DM communication. In such an example, the context data can persist in the DM communication. In some examples, the channel management component 120 can move the portion of the context data from the DM communication to the new DM communication. In some such examples, any context data that was not moved to the new DM communication can persist in the DM communication.

In some examples, context data that is transferred from a source communication to a destination may maintain author attribution data and/or encryption data. For example, author attribution data may indicate a user who originally authored the conversation data (e.g., the thread/reply, etc.). In some examples, the author attribution data may also include or otherwise indicate a location associated with the user when they authored or posted a communication, organization information associated with the author, and the like. Further, and in some examples, encryption data may include one or more of a public key or a private key for encrypting or decrypting the communication data. In some examples, the encryption data can be associated with a particular organization that the user or author is associated with.

In some examples, the DM messaging component 116 and/or the channel management component 120 can analyze context data associated with the DM communication and recommend individual message(s) or data to associate with the new DM communication. That is, the messaging component 116 and/or the channel management component 120 can analyze context data associated with the DM communication using natural language processing, image recognition, or other data parsing techniques to identify context data to recommend for association with the new DM communication. In some examples, a machine-learning mechanism can be trained to output a relevance score and message(s) and/or data associated with a relevance score that meets or exceeds a threshold (e.g., relevance to the to-be-added users, etc.) can be recommended for association with the new DM communication. In some examples, the messaging component 116 and/or the channel management component 120 can cause a recommendation to be presented via the user interface 142, via the user interface element 228, or otherwise. In at least one example, based at least in part on the user providing an input indicating that the recommended context data is to be associated with the new DM communication, the channel management component 120 can receive such an input (e.g., via the application 138) and can determine the portion of the context data to be associated with the new DM communication (e.g., the recommended message(s) or data). The channel management component 120 can then associate the portion of the context data with the new DM communication. In some examples, the channel management component 120 can duplicate (e.g., copy) the portion of the context data and associate the duplicated portion of the context data with the new DM communication. In such an example, the context data can persist in the DM communication. In some examples, the channel management component 120 can move the portion of the context data from the DM communication to the new DM communication. In some such examples, any context data that was not moved to the new DM communication can persist in the DM communication.

As described above, additional or alternative options can be presented via the user interface element 228 to enable the user to designate (i) whether to include context data or (ii) an amount of context data to include in a new DM communication that is to be generated based on an existing DM communication in a response to a modification of membership of the DM communication.

Figure 3:
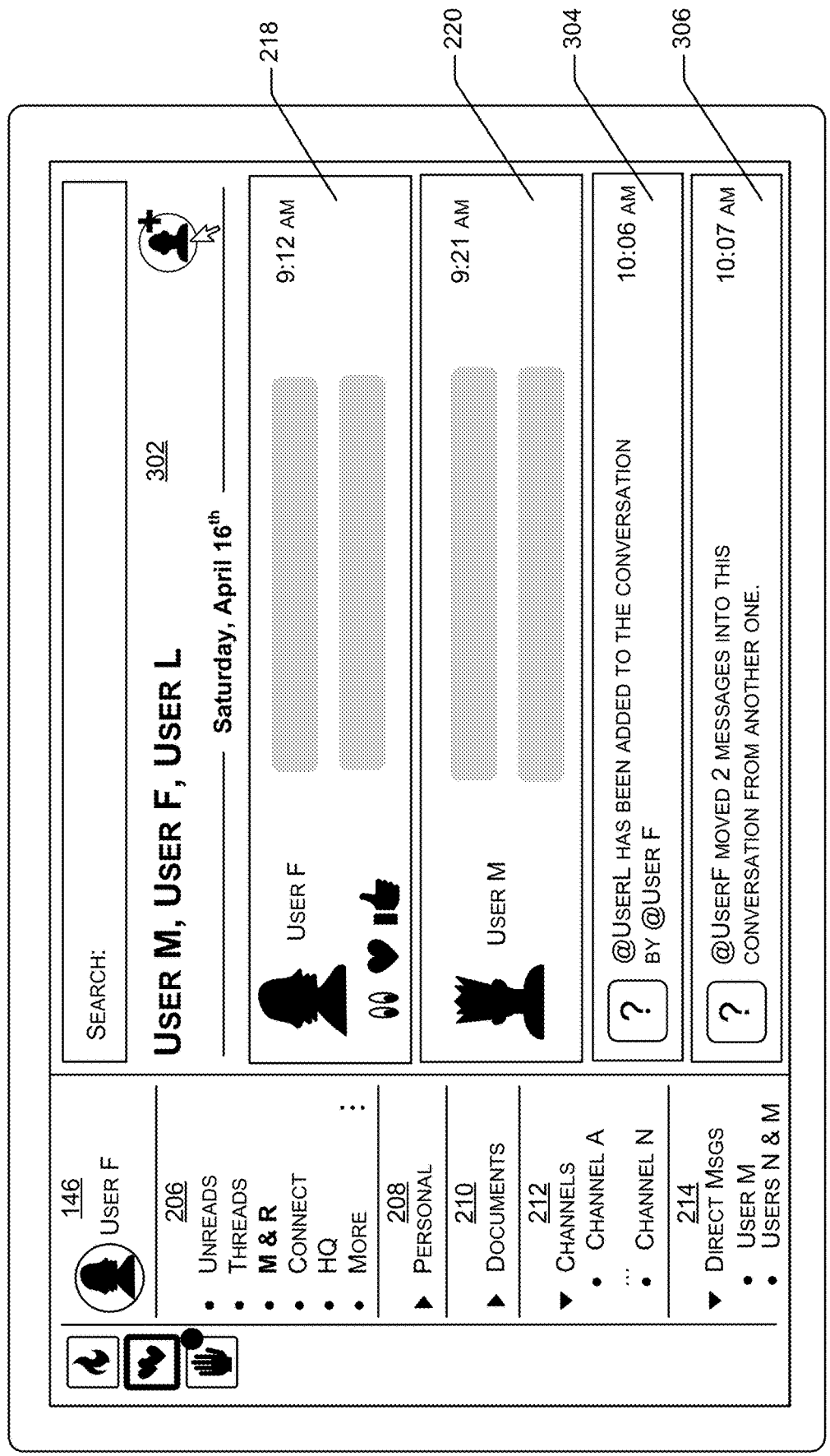
FIG. 3 illustrates an example of a user interface associated with a new DM communication including context data transferred from the DM communication described in FIGS. 2A and 2B, as described herein.

As described above, based at least in part on detecting a selection of a selectable control associated with including context data from a DM communication in a new DM communication, the application 138 can send an indication of such to the messaging component 116, which in turn can provide an indication to the channel management component 120 to transfer context data from the DM communication to the new DM communication. FIG. 3 illustrates a new DM communication, depicted as a MPDP communication between User M, User F, and User L. In some examples, the new DM communication may include a user interface 302. The user interface 302 may be similar to the user interface 142 and may be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein (e.g., the MPDM communication between User M, User F, and User L).

For example, as depicted in FIG. 3, the user (here, User F) has designated a time (here, Sunday, April 16$^{th}$), such that context data associated with the DM communication on or after the time is to be associated with the new DM communication. Context data on or after Sunday, April 16$^{th}$ is transferred from the DM communication to the new DM communication between User M, User F, and User L. Thus, the messages 218 and 220, posted by User F and User M, respectively, are transferred from the DM communication in user interface 142 to the new DM communication.

In some examples, based at least in part on detecting an indication to add an additional user to a new DM communication, the application 138 may send an indication to the messaging component 116, which in turn may provide an indication to the channel management component 120 to send one or more notifications to the new DM communication that one or more additional users have been added to the new DM communication, such as notification 304. Additionally or alternatively, based at least in part on detecting a transfer of one or more messages to a new DM communication, the application 138 may send an indication to the messaging component 116, which in turn may provide an indication to the channel management component 120 to send one or more notifications to the new DM communication that one or more messages have been moved, such as notification 306.

Figure 4:
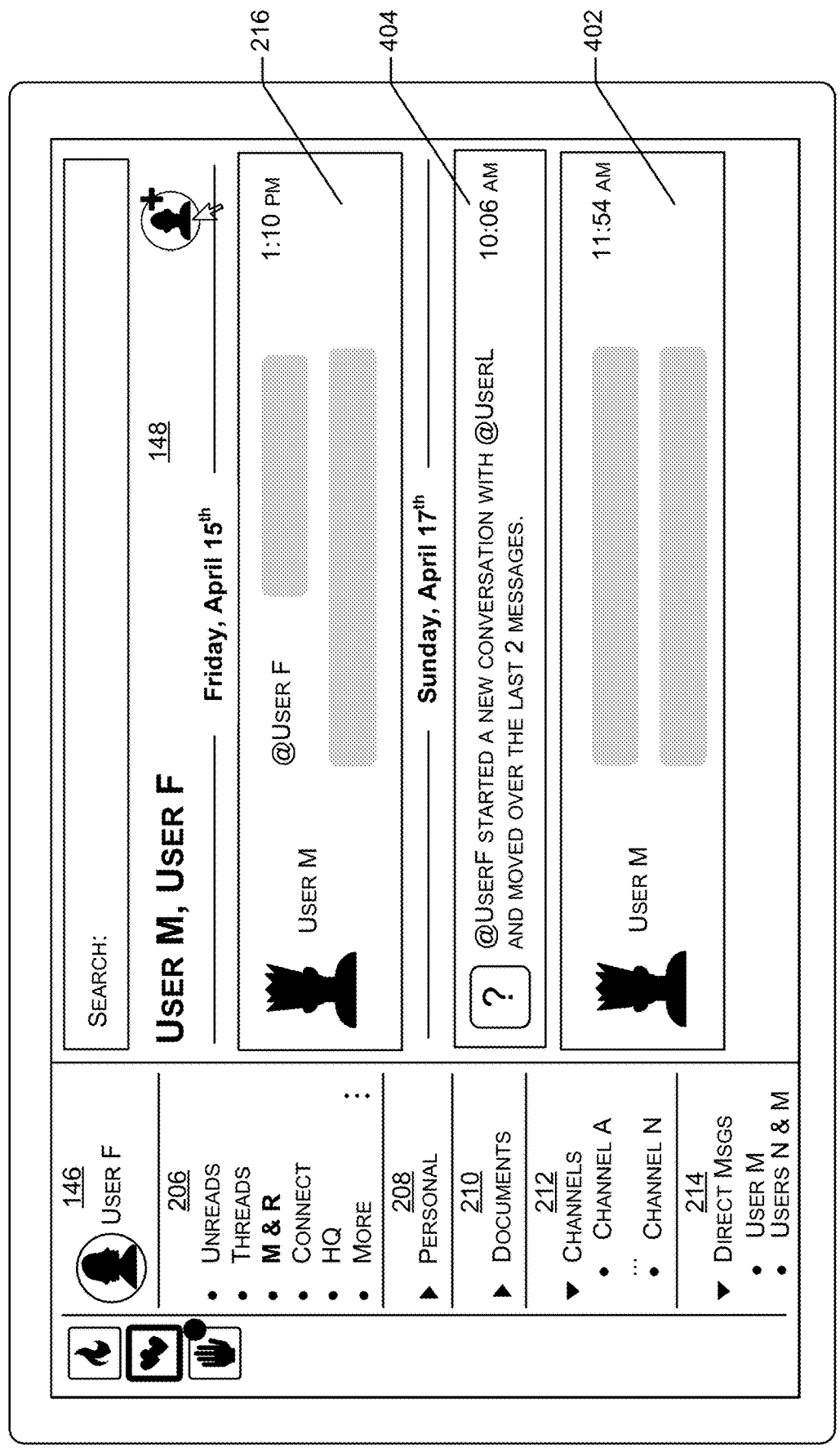
FIG. 4 illustrates an example of a user interface associated with the DM communication described in FIGS. 2A and 2B after context data has been transferred to a new DM communication, as described herein.

As described above, based at least in part on associating a portion of context data with a new DM communication, the channel management component 120 may duplicate the portion of context data and associate the duplicated portion of the context data with the new DM communication, allowing the context data to persist in the DM communication. Alternatively, in some examples, the channel management component 120 may transfer the portion of context data to the new DM communication, such that the portion of the context data moved to the new DM communication may not persist in the DM, while any context data that was not moved may persist. FIG. 4 illustrates a DM communication after a portion of context data has been moved to a new DM communication. For example, the DM communication illustrated in FIG. 4 may be the same DM communication channel described in FIGS. 1-2B. As depicted in FIG. 4, the context data on and after Saturday, April 16$^{th}$ has been transferred to a new DM communication, described above. However, the message 216 posted by User M on Friday, April 15$^{th}$ was posted prior to April 16, and thus remains in the DM communication. In some examples, the DM communication may still be accessible for users to communicate. For example, while a portion of the context data was transferred to the new DM communication illustrated in FIG. 3, the users associated with the DM (User M and User F) can still share data via the DM communication. This is illustrated by the new message 402 posted by User M on Sunday, April 17$^{th}$.

In some examples, based at least in part on detecting a transfer of context data to a new DM communication, the application 138 may send an indication to the messaging component 116, which in turn may provide an indication to the channel management component 120 to send one or more notifications to the DM channel that a new DM communication has been created with an additional user and/or that context data from the DM has been transferred to the new DM communication, such as by notification 404.

In some examples, context data may include one or more messages associated with a thread. A thread (also referred to as a message thread) can be a message associated with another message that is not posted to a communication channel, but instead is maintained within an object associated with the original message, also referred to as the "root" message. Messages and/or threads can be associated with file(s), emoji(s), app(s), etc. In some examples, context data may include a portion of a thread, but may exclude the root message. In this instance, the application 138 and/or the channel management component 120 may copy the portion of the thread to the new DM communication without the root message. In other examples, application 138 and/or the channel management component 120 may copy both the portion of the thread and the root message to the new DM communication. In some examples, the messages can be interleaved or otherwise combined based on time stamps associated with respective root messages. Further, in other examples, the application 138 and/or the channel management component 120 may refrain from copying the message and the root message to the new DM communication.

In some examples, the communication platform may identify an existing channel containing the desired users, rather than generating a new DM communication. For example, based at least in part on receiving, from at least one of two or more users, a request to (i) identify an additional user not previously associated with the DM communication and (ii) designate whether to include conversation history data associated with the DM communication, the application 138 may cause the channel management component 120 to (i) identify, as a destination channel, an existing DM communication between the two or more users and the additional user, or (ii) generate a new DM communication including the two or more users and the additional user.

The user interface 142 described above with reference to FIGS. 1-3 is a non-limiting example of a user interface that can be presented via the user computing device 104 (e.g., by the application 138). In some examples, the application 138 can receive data from the messaging component 116 and/or the channel management component 120, and the application 138 can generate and present the user interface 142 based at least in part on the data. In other examples, the application 138 can receive data and/or instructions for generating the user interface 142 from the messaging component 116 and/or the channel management component 120. In such an example, the application 138 can present the user interface 142 based at least in part on the instructions. Additional or alternative data can be presented via a user interface and additional or alternative configurations can be imagined.

Furthermore, while FIGS. 1-4 describe generating a new DM based at least in part on a request to modify membership of a DM communication and transferring context data to the new DM, in some examples, an additional user can be added and/or a user can be removed via creation of a new channel instead of a new DM communication. That is, in an example, a first user associated with a DM communication can request to add a second user to the DM communication and the messaging component 116 may generate a new channel. In some examples, the first user can interact with a user interface element, similar to the user interface elements described above, to designate (i) whether to include context data or (ii) an amount of context data to include in the new channel that is to be generated based on the existing DM communication in response to the addition of the second user to the new channel. Similarly, a new channel can be generated in response to a request to remove a member from a DM communication.

Figure 5:
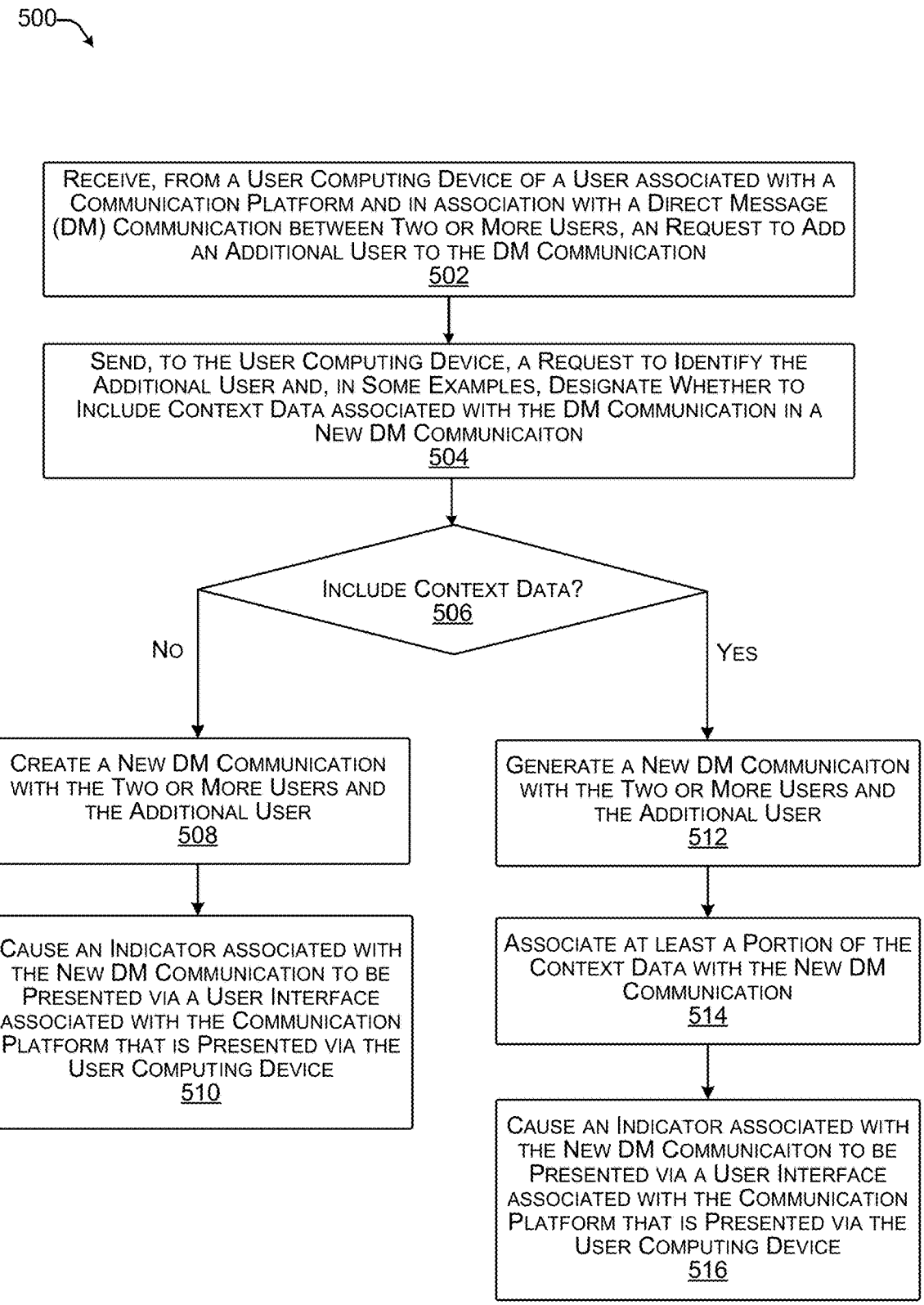
FIG. 5 illustrates an example process for adding an additional user to an existing DM communication between two or more other users, as described herein.
Figure 6:
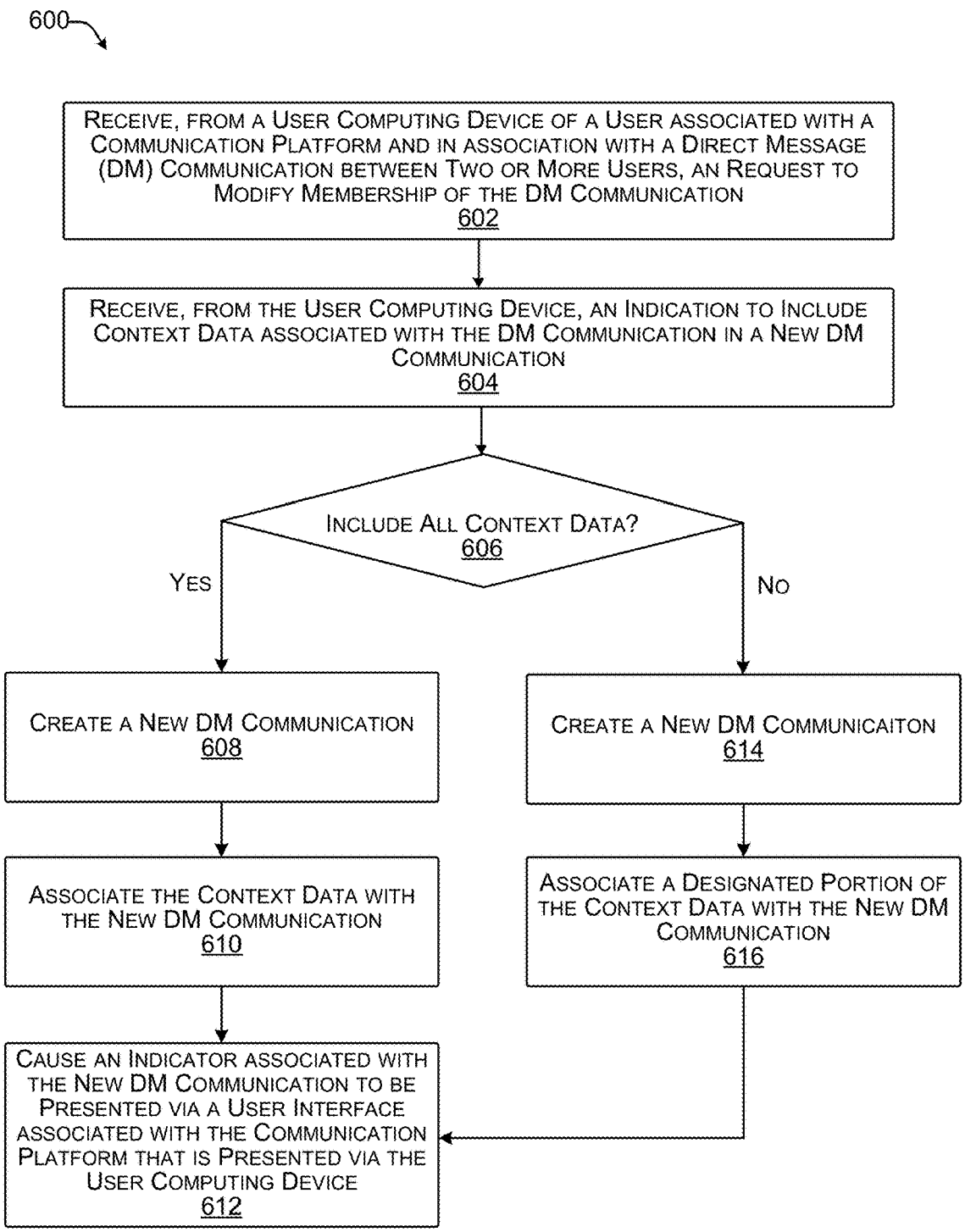
FIG. 6 illustrates an example process for determining an amount of context data to associate with a new DM communication generated based at least in part on an existing DM communication, as described herein.
Figure 7:
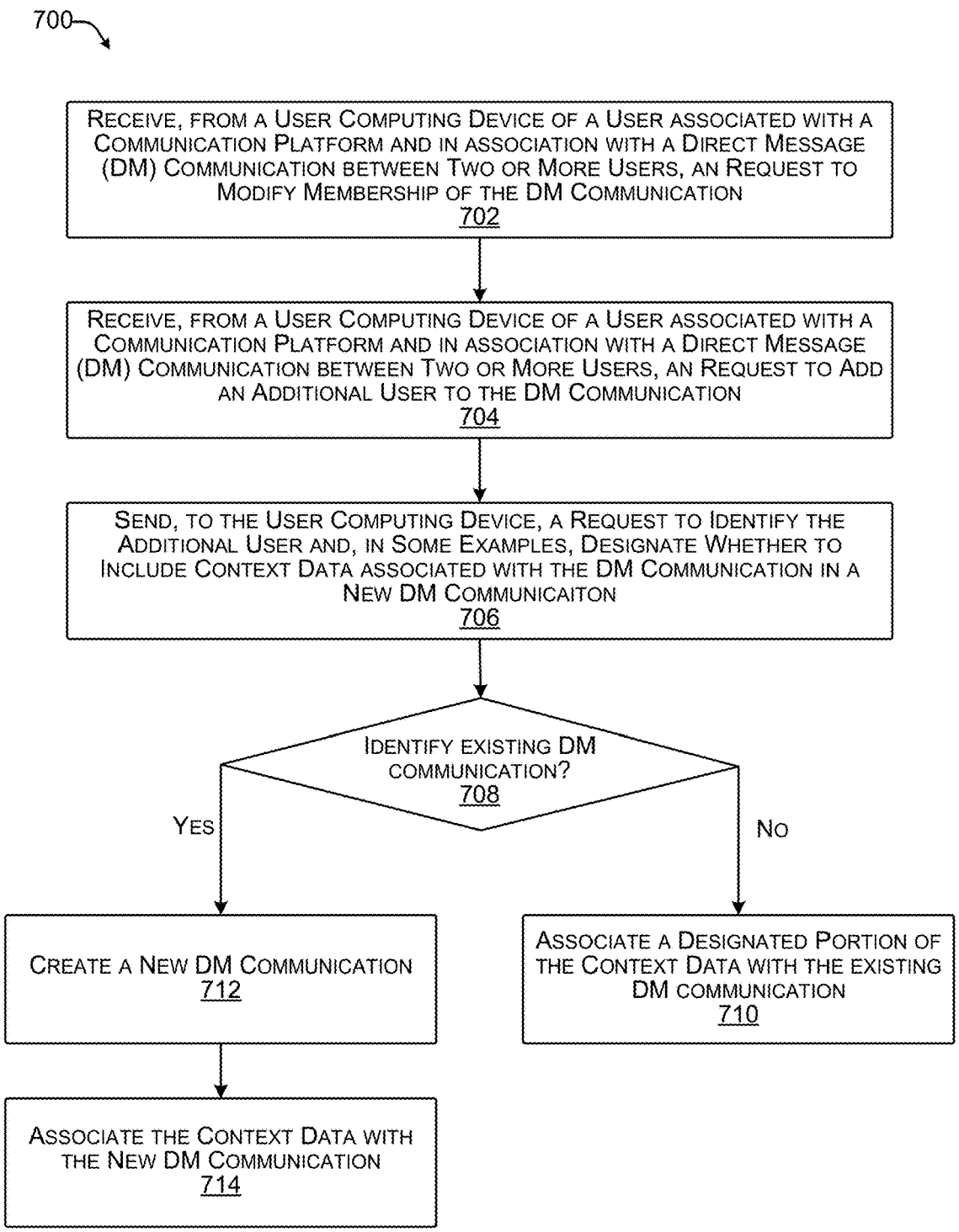
FIG. 7 illustrates an example process for determining a DM communication in which to transfer context data, as described herein.

FIGS. 5-7 are flowcharts showing example processes involving techniques as described herein. The processes illustrated in FIGS. 5-7 are described with reference to components described above with reference to the environment 100 shown in FIG. 1 for convenience and ease of understanding. However, the processes illustrated in FIGS. 5-7 are not limited to being performed using the components described above with reference to the environment 100. Moreover, the components described above with reference to the environment 100 are not limited to performing the processes illustrated in FIGS. 5-7.

The processes in FIGS. 5-7 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-7 can be combined in whole or in part with each other or with other processes.

FIG. 5 illustrates an example process 500 for adding an additional user to an existing DM communication between two or more other users, as described herein.

At operation 502, the messaging component 116 can receive, from a user computing device 104 of a user associated with a communication platform and in association with a DM communication, a request to add an additional user to the DM communication. In at least one example, a user associated with a DM communication can interact with a user interface, such as the user interface 142, presented via the user computing device 104 to request to add another user to the DM communication. In some examples, the user interface 142 can include a user interface element, such as the user interface elements 152 and 228 described above, that is selectable, or can otherwise be actuated, to cause a request to be sent from the user computing device 104 to the server(s) 102 via the network(s) 106. In at least one example, the application 138 can detect actuation of the user interface elements 152 and/or 228 and can send a request to the server(s) 102. In at least one example, the messaging component 116 can receive such a request.

At operation 504, the messaging component 116 can send, to the user computing device 104, a request to identify the additional user and, in some examples, designate whether to include context data associated with the DM communication in a new DM communication. In at least one example, the messaging component 116 can receive the request to add a user to a DM communication and can send a request back to the user computing device 104, prompting the user to identify the additional user to be added and, in some examples, designate (i) whether to include context data from the DM communication in a (to be generated) new DM communication and/or (ii) an amount of context data from the DM communication to include in the new DM communication. Such a request (e.g., from the messaging component 116) can cause a user interface element, such as the user interface elements 152 and/or 228, to be presented via the user interface 142 that can be presented via a user computing device 104 of the requesting user.

In an additional or alternative example, a user can request to add an additional user to a DM communication by mentioning the user in a message associated with the DM communication, performing a search for the user and selecting an option to add the user to the DM communication, or the like. In such an example, the messaging component 116 may not request the user to identify the additional user. In such an example, the messaging component 116 may still request that the user designate (i) whether to include context data from the DM communication in a (to be generated) new DM communication and/or (ii) an amount of context data from the DM communication to include in the new DM communication.

At operation 506, the messaging component 116 can determine whether to include context data from the DM communication in the new DM communication. In at least one example, the messaging component 116 can receive input (or an indication thereof) provided via the user interface 146 and/or user interface element 226 presented via the user interface 146. In at least one example, the application 138 can send such input (or an indication thereof) to the messaging component 116. Such input can include an identifier associated with the additional user to be added and, in some examples, an indication of (i) whether to include context data from the DM communication in a (to be generated) new DM communication and/or (ii) an amount of context data from the DM communication to include in the new DM communication. In at least one example, if the indication indicates that the user opted not to include context data and/or selected an option associated with not providing any context data (i.e., "no" at operation 406), the messaging component 116 can create a new DM communication with the two or more users and the additional user, as illustrated at operation 508. In such an example, the new DM communication may not include any context data and the members of the new DM communication can include the two or more users and the additional user.

At operation 510, the channel management component 120 can cause an indicator associated with the new DM communication to be presented via a user interface associated with the communication platform that is presented via the user computing device 104. As described above, in some examples, the user interface 142 can include a first region 144, or pane, that includes indicator(s) (e.g., user interface element(s) or object(s)) representing virtual space(s) associated with the workspace(s) with which the user (e.g., account of the user) is associated. In at least one example, the first region 144 can include one or more sub-regions, or sub-panes, which can represent different virtual spaces. For example, a first sub-region 146 can include indicators representing virtual spaces that can aggregate data associated with a plurality of channels and/or workspaces. In at least one example, each virtual space can be associated with an indicator in the first sub-region 200. In at least one example, the first region 144 of the user interface 142 can include a second sub-region 202, or sub-pane, that includes indicators representing channels. In some examples, the channels can include public channels, private channels, shared channels (e.g., between workspaces or organizations), single workspace channels, cross-workspace channels, combinations of the foregoing, or the like. In addition to the second sub-region 202, the first region 144 can include a third sub-region 204, or sub-pane, that can include indicators representative of communications with individual users or multiple specified users (e.g., instead of all, or a subset of, members of an organization). Such communications can be referred to as DM communications, as described above. In at least one example, an indicator associated with the new DM communication can be presented via the third sub-region 204 of the user interface 142.

In an alternative example, a new channel can be generated, as described herein, instead of a new DM communication. In such an example, however, the new DM communication may not include any context data.

If the user provides an input to include at least some context data (i.e., "yes" at operation 506), the messaging component 116 can provide an indication of such to the channel management component 120. In at least one example, based at least in part on the user indicating to include at least a portion of the context data, the channel management component 120 can generate a new DM communication with the two or more users and the additional user, as illustrated at operation 512. That is, in at least one example, if the input is associated with an indication to include all of the context data or some of the context data associated with the DM communication, the messaging component 116 can provide an indication of such to the channel management component 120. The channel management component 120 can generate a new DM communication, wherein the two or more users and the additional user are members of the new DM communication. In at least one example, the new DM communication can be associated with a data structure, wherein indications of the two or more users and the additional user are associated therewith as members of the new DM communication.

At operation 514, the channel management component 120 can associate at least a portion of the context data with the new DM communication. In at least one example, the channel management component 120 can associate the designated amount of context data with the channel. In at least one example, the channel management component 120 can associate the designated amount of context data with the new DM communication by "transferring" the designated context data from the DM communication (e.g., a data structure associated therewith) to the new DM communication (e.g., a data structure associated therewith). As described above, in some examples, such "transferring" can be done by duplicating the designated context data in the DM communication and associating the duplicated context data with the new DM communication, moving the designated context data from the DM communication to the new DM communication, or the like. That is, in some examples, the channel management component 120 can duplicate (e.g., copy) the designated context data and associate the duplicated context data with the new DM communication. In such an example, the duplicated context data can persist in the DM communication (and thus the DM communication can persist, too). In some examples, the channel management component 120 can move the designated context data from the DM communication to the new DM communication. In such examples, such context data may no longer exist in the DM communication and, if all context data is moved, the DM communication may no longer exist.

At operation 516, the channel management component 120 can cause an indicator associated with the new DM communication to be presented via a user interface associated with the communication platform that is presented via the user computing device 104. As described above, in some examples, the user interface 142 can include different regions that can include indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces, a second sub-region 202, or sub-pane, that includes indicators representing channels, and a third sub-region 204, or sub-pane, that can include indicators representative of communications with individual users or multiple specified users (e.g., instead of all, or a subset of, members of an organization).

As illustrated in FIGS. 2A and 2B above, prior to the new DM communication being generated, the DM communication can be associated with an indicator presented via the third sub-region 204. After the new DM communication is generated, the channel management component 120 can cause an indicator associated with the new DM communication to be presented via the second sub-region 202. If the DM communication still exists, it can continue to be presented via the third sub-region 204. In at least one example, if the user selects, or otherwise actuates, the indicator associated with the new DM communication, at least a portion of the context data can be presented via the second region 146 of the user interface 142. That is, based at least in part on detecting an input indication a selection, or other actuation, the indicator associated with the new DM communication, the channel management component 120 can cause at least a portion of the context data to be presented via the second region 146 of the user interface 142, as a feed, for example.

FIG. 6 illustrates an example process 600 for determining an amount of context data to associate with a new DM communication generated based at least in part on an existing DM communication, as described herein.

At operation 602, the messaging component 116 can receive, from a user computing device 104 of a user associated with a communication platform and in association with a DM communication, a request to modify membership of the DM communication, as described above with reference to operation 502 of FIG. 5.

At operation 604, the messaging component 116 can receive, from the user computing device, an indication to include context data associated with the DM communication in a new DM communication. As described above, a user can provide an input via a user interface element, such as the user interface elements 152 and 228, presented via a user interface, such as the user interface 142, presented via the user computing device 104. For example, a user can interact with a user interface element such as the user interface element 152 and 228 to provide an indication to include context data with the new DM communication and, in some examples, an amount of context data to include with the new DM communication. The application 138 can receive such input and send the input to the messaging component 116. In at least one example, the messaging component 116 can receive the input (or an indication of such) and can provide the input (or an indication of such) to the channel management component 120.

At operation 606, the messaging component 116 can determine whether the indication to include context data indicates that all of the context data is to be included in the new DM communication or a portion of the context data is to be included in the new DM communication. If the user provides an input to include all of the context data, the messaging component 116 can provide an indication of such to the channel management component 120. In at least one example, based at least in part on the input (or an indication thereof) indicating to include at least some context data, the channel management component 120 can generate a new DM communication, as illustrated at operation 608. In at least one example, the new DM communication can be associated with a different group of users than the DM communication. That is, the DM communication can be associated with a first group of users and the new DM communication can be associated with a second group of users, wherein a user is added to the first group of users (and thus, the second group of users includes the first group of users and the additional user) and/or a user is removed from the first group of users (and thus, the second group of users does not include the removed user). In at least one example, based at least in part on the input (or an indication thereof) indicating to include all of the context data associated with the DM communication, the new DM communication can be associated with all of the context data. That is, the channel management component 120 can associate all of the context data associated with the DM communication (e.g., a data structure associated therewith) with the new DM communication (e.g., a data structure associated therewith), as illustrated at operation 610.

At operation 612, the channel management component 120 can cause an indicator associated with the new DM communication to be presented via a user interface associated with the communication platform that is presented via the user computing device 104. As described above, in some examples, the user interface 142 can include different regions that can include indicator(s) (e.g., user interface element(s) or object(s)) representing virtual space(s) associated with the workspace(s) with which the user (e.g., account of the user) is associated. In at least one example, the first region 144 can include one or more sub-regions, or sub-panes, which can represent different virtual spaces. For example, a first sub-region 200 can include indicators representing virtual spaces that can aggregate data associated with a plurality of channels and/or workspaces, a second sub-region 202, or sub-pane, that includes indicators representing channels, and a third sub-region 204, or sub-pane, that can include indicators representative of communications with individual users or multiple specified users (e.g., instead of all, or a subset of, members of an organization).

As illustrated in FIGS. 2A and 2B above, prior to the new DM communication being generated, the DM communication can be associated with an indicator presented via the third sub-region 204. After the new DM communication is generated, the channel management component 120 can cause an indicator associated with the new DM communication to be presented via the second sub-region 202. If the DM communication still exists, it can continue to be presented via the third sub-region 204. In at least one example, if the user selects, or otherwise actuates, the indicator associated with the new DM communication, at least a portion of the context data can be presented via the second region 146 of the user interface 142. That is, based at least in part on detecting an input indication a selection, or other actuation, the indicator associated with the new DM communication, the channel management component 120 can cause at least a portion of the context data to be presented via the second region 146 of the user interface 142, as a feed, for example.

As described above, in some examples, an option presented via the user interface element 152 and/or 226 can enable a portion of the context data associated with a DM communication to be transferred to the new DM communication. For example, an option presented via the user interface element 228 can enable the user to designate context data associated with a characteristic (e.g., date, time, period of time, topic, etc.) to be transferred to the new DM communication. As described above with reference to FIG. 2B, in some examples, the user interface element 228 can enable a user to designate a date, such that context data associated with the DM communication on or after the date is to be associated with the new DM communication. In some examples, the user interface element 228 can enable a user to designate a time, such that context data associated with the DM communication on or after the time is to be associated with the new DM communication. In some examples, the user interface element 228 can enable a user to designate a period of time, such that context data associated with the DM communication during the period of time is to be associated with the new DM communication. In some examples, the user interface element 226 can enable a user to designate a topic, such that context data associated with the DM communication associated with the topic is to be associated with the new DM communication.

In some examples, the user interface element 228 can enable a user to designate particular message(s) or data that is to be associated with the new DM communication. In at least one example, based at least in part on detecting a selection of a selectable control associated with a particular option (e.g., associated with a particular characteristic) and/or receiving input associated with selected message(s) and/or data, the application 138 can send an indication of such to the messaging component 116, which can provide the indication to the channel management component 120.

As described above, in some examples, the messaging component 116 and/or the channel management component 120 can analyze context data associated with the DM communication and recommend individual message(s) or data to associate with the new DM communication. In some examples, the messaging component 116 and/or the channel management component 120 can cause a recommendation to be presented via the user interface 142, via the user interface element 228, or otherwise. In at least one example, based at least in part on the user providing an input indicating that the recommended context data is to be associated with the new DM communication, the channel management component 120 can receive such an input (e.g., via the application 138).

If the user provides an input to include less than all of the context data (i.e., a portion of the context data), the messaging component 116 can provide an indication of the designated context data to the channel management component 120, and the channel management component 120 can determine the context data to be associated with the new DM communication based at least in part on the such indication. In at least one example, the channel management component 120 can generate a new DM communication, as illustrated at operation 614, which can be associated with the designated portion of the context data. That is, the channel management component 120 can associate the designated portion of the context data with the new DM communication, as illustrated at operation 616. In at least one example, the new DM communication can be associated with a different group of users than the DM communication. That is, the DM communication can be associated with a first group of users and the new DM communication can be associated with a second group of users, wherein a user is added to the first group of users (and thus, the second group of users includes the first group of users and the additional user) and/or a user is removed from the first group of users (and thus, the second group of users does not include the removed user).

After associating the designated portion of the context data with the new DM communication, the channel management component 120 can cause an indicator associated with the new DM communication to be presented via a user interface associated with the communication platform that is presented via the user computing device, as illustrated at operation 612.

FIG. 7 illustrates an example process 700 for determining a DM communication for transferring context data to.

At operation 702, the messaging component 116 can receive, from a user computing device 104 of a user associated with a communication platform and in association with a DM communication, a request to modify membership of the DM communication, as described above with reference to operation 502 of FIG. 5 and 602 of FIG. 6.

At operation 704, the messaging component 116 can receive, from the user computing device 104 a request to add an additional user to the DM communication, as described above with respect to operation 502 of FIG. 5.

At operation 706, the messaging component 116 can send, to the user computing device, a request to identify the additional user and, in some examples, designate whether to include context data associated with the DM communication in a new DM, as described above with respect to operation 504 of FIG. 5.

At operation 708, the application 138 may send, to the channel management component 120, a request to identify, as a destination DM communication, an existing DM communication between two or more users of the DM communication and the additional user.

If the channel management component 120 identifies an existing DM communication between the two or more users of the DM communication and the additional user (i.e., "yes" at operation 708), the channel management component 120 can associate a designated portion of the context data with the existing DM communication, illustrated at operation 710 and similar to operation 616 in FIG. 6.

If the channel management component 120 does not identify an existing DM communication between the two or more users of the DM communication and the additional user (i.e., "no" at operation 708), the channel management component 120 can generate a new DM communication, as illustrated at operation 712 and similar to operation 608 in FIG. 6. In one example, based at least in part on the input indicating to include all of the context data associated with the DM communication, the new DM communication can be associated with all of the context data. That is, the channel management component 120 can associate all of the context data associated with the DM communication (e.g., a data structure associated therewith) with the new DM communication (e.g., a data structure associated therewith), as illustrated at operation 714 and similar to operation 610 in FIG. 6.

As described above with reference to FIGS. 1-7, techniques described herein are directed to streamlining modifications of membership to DM communications and transferring context data to new or existing DM communications. As described above, the techniques described herein enable users to identify an existing DM communication or generate a new DM communication based at least in part on a previous DM communication and transfer previous messages and other data, allowing newly added users to see the conversation that prompted their addition to the new DM communication. Techniques described herein therefore provide for a faster "conversion" process (i.e., "converting" a DM communication to a new communication channel). That is, techniques described herein can streamline the modification of membership of DM communications as it pertains to adding or removing members from existing DM communications, creating new DM communications, and transferring data related to the DM communication to the new DM communication.

Example Clauses

A: A method, implemented at least in part by one or more computing devices of a communication platform, the method comprising: receiving, in association with a direct message (DM) communication between two or more users of the communication platform, a first request to add a new user to the DM communication, wherein the DM communication is a first private communication that is not discoverable to other users of the communication platform; sending, to a user computing device associated with a user of the two or more users, a second request to (i) identify an additional user not previously associated with the DM communication and (ii) designate whether to include conversation history data associated with the DM communication in a multi-party DM (MPDM) communication; based at least in part on receiving (i) an identifier associated with the additional user and (ii) an indication to include a portion of the conversation history data associated with the DM communication in the MPDM communication, creating a destination MPDM communication between the two or more users and the additional user; and copying, based at least in part on the indication, the portion of the conversation history data from a first data structure associated with the DM communication to a second data structure associated with the destination MPDM communication, wherein the two or more users and the additional user are associated with the destination MPDM communication, and wherein the MPDM communication is a second private communication that is not discoverable to other users of the communication platform.

B: The method of paragraph A, further comprising: displaying, via at least one user computing device associated with at least one user of the two or more users and the additional user, and in association with the destination MPDM communication, an affordance that permits the at least one user to invite one or more other users not previously associated with the destination MPDM communication to join the destination MPDM communication.

C: The method of paragraph A or B, wherein the indication comprises at least one of: a period of time of the DM communication; a selection of one or more messages of the DM communication; or a selection of one or more users of the DM communication.

D: The method of any of paragraphs A-C, further comprising: determining that the indication of the portion of the conversation history data captures a message of a message thread but excludes a root message of the message thread; and at least one of: copying the message without the root message to the destination MPDM communication; copying the message and the root message to the destination MPDM communication; or refraining from copying the message and the root message to the destination MPDM communication.

E: The method of any of paragraphs A-D, wherein the indication to include the portion of the conversation history data captures at least one document posted in the DM communication, the method further comprising: copying at least one document to the destination MPDM communication.

F. The method of any of paragraphs A-E, wherein copying the portion of the conversation history data from the first data structure associated with the DM communication to the second data structure associated with the destination MPDM communication further comprises: interleaving the portion of the conversation history data into messages of the destination MPDM communication based at least in part on a time stamp associated with a root message of a message thread.

G: The method of any of paragraphs A-F, wherein the conversation history data is associated with at least one of author attribution data or encryption data, the method further comprising: refraining from changing the at least one of the author attribution data or the encryption data in connection with copying the portion of the conversation history data to the destination MPDM communication.

H. One or more computer-readable media comprising instructions that, when executed by one or more processors, cause the one or more processors to perform operations comprising: receiving, in association with a direct message (DM) communication between two or more users of a communication platform, a first request to add a new user to the DM communication, wherein the DM communication is a first private communication that is not discoverable to other users of the communication platform; sending, to a user computing device associated with a user of the two or more users, a second request to (i) identify an additional user not previously associated with the DM communication and (ii) designate whether to include conversation history data associated with the DM communication in a multi-party DM (MPDM) communication; based at least in part on receiving (i) an identifier associated with the additional user and (ii) an indication to include a portion of the conversation history data associated with the DM communication in the MPDM communication, creating a destination MPDM communication between the two or more users and the additional user; and copying, based at least in part on the indication, the portion of the conversation history data from a first data structure associated with the DM communication to a second data structure associated with the destination MPDM communication, wherein the two or more users and the additional user are associated with the destination MPDM communication, and wherein the MPDM communication is a second private communication that is not discoverable to other users of the communication platform.

I: The one or more computer-readable media of paragraph H, the operations further comprising: displaying, via at least one user computing device associated with at least one user of the two or more users and the additional user, and in association with the destination MPDM communication, an affordance that permits the at least one user to invite one or more other users not previously associated with the destination MPDM communication to join the destination MPDM communication.

J: The one or more computer-readable media of paragraph H or I, wherein the indication comprises at least one of: a period of time of the DM communication; a selection of one or more messages of the DM communication; or a selection of one or more users of the DM communication.

K: The one or more computer-readable media of any of paragraphs H-J, the operations further comprising: determining that the indication of the portion of the conversation history data captures a message of a message thread but excludes a root message of the message thread; and at least one of: copying the message without the root message to the destination MPDM communication; copying the message and the root message to the destination MPDM communication; or refraining from copying the message and the root message to the destination MPDM communication.

L. The one or more computer-readable media of any of paragraphs H-K, wherein copying the portion of the conversation history data from the first data structure associated with the DM communication to the second data structure associated with the destination MPDM communication further comprises: interleaving the portion of the conversation history data into messages of the destination MPDM communication based at least in part on a time stamp associated with a root message of a message thread.

M: The one or more computer-readable media of any of paragraphs H-L, wherein the conversation history data is associated with at least one of author attribution data or encryption data, the operations further comprising: refraining from changing the at least one of the author attribution data or the encryption data in connection with copying the portion of the conversation history data to the destination MPDM communication.

N: The one or more computer-readable media of any of paragraphs H-M, wherein the indication to include the portion of the conversation history data captures at least one document posted in the DM communication, the operations further comprising: copying at least one document to the destination MPDM communication.

O. A system associated with a communication platform, wherein the system comprises: one or more processors; and one or more non-transitory computer-readable media comprising instructions that, when executed by the one or more processors, cause the system to perform operations comprising: receiving, in association with a direct message (DM) communication between two or more users of the communication platform, a first request to add a new user to the DM communication, wherein the DM communication is a first private communication that is not discoverable to other users of the communication platform; sending, to a user computing device associated with a user of the two or more users, a second request to (i) identify an additional user not previously associated with the DM communication and (ii) designate whether to include conversation history data associated with the DM communication in a multi-party DM (MPDM) communication; based at least in part on receiving (i) an identifier associated with the additional user and (ii) an indication to include a portion of the conversation history data associated with the DM communication in the MPDM communication, creating a destination MPDM communication between the two or more users and the additional user; and copying, based at least in part on the indication, the portion of the conversation history data from a first data structure associated with the DM communication to a second data structure associated with the destination MPDM communication, wherein the two or more users and the additional user are associated with the destination MPDM communication, and wherein the MPDM communication is a second private communication that is not discoverable to other users of the communication platform.

P: The system of paragraph O, the operations further comprising: determining that the indication of the portion of the conversation history data captures a message of a message thread but excludes a root message of the message thread; and at least one of: copying the message without the root message to the destination MPDM communication; copying the message and the root message to the destination MPDM communication; or refraining from copying the message and the root message to the destination MPDM communication.

Q: The system of paragraph O or P, wherein the indication to include the portion of the conversation history data captures at least one document posted in the DM communication, the operations further comprising: copying at least one document to the destination MPDM communication.

R. The system of any of paragraphs O-Q, wherein copying the portion of the conversation history data from the first data structure associated with the DM communication to the second data structure associated with the destination MPDM communication further comprises: interleaving the portion of the conversation history data into messages of the destination MPDM communication based at least in part on a time stamp associated with a root message of a message thread.

S: The system of any of paragraphs O-R, the operations further comprising: displaying, via at least one user computing device associated with at least one user of the two or more users and the additional user, and in association with the destination MPDM communication, an affordance that permits the at least one user to invite one or more other users not previously associated with the destination MPDM communication to join the destination MPDM communication.

T: The system of any of paragraphs O-S, wherein the indication comprises at least one of: a period of time of the DM communication; a selection of one or more messages of the DM communication; or a selection of one or more users of the DM communication.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

What is claimed is:

1. A method, implemented at least in part by one or more computing devices of a communication platform, the method comprising:
receiving, in association with a direct message (DM) communication between two or more users of the communication platform, a first request to add a new user to the DM communication, wherein the DM communication is a first private communication that is not discoverable to other users of the communication platform;
sending, to a user computing device associated with a user of the two or more users, a second request to (i) identify an additional user not previously associated with the DM communication and (ii) designate whether to include conversation history data associated with the DM communication in a multi-party DM (MPDM) communication;
based at least in part on receiving (i) an identifier associated with the additional user and (ii) an indication to include a portion of the conversation history data associated with the DM communication in the MPDM communication, creating a destination MPDM communication between the two or more users and the additional user; and
copying, based at least in part on the indication, the portion of the conversation history data from a first data structure associated with the DM communication to a second data structure associated with the destination MPDM communication, wherein the two or more users and the additional user are associated with the destination MPDM communication, and wherein the MPDM communication is a second private communication that is not discoverable to other users of the communication platform, wherein the first data structure and the second data structure exist in parallel.

2. The method of claim 1, further comprising:
displaying, via at least one user computing device associated with at least one user of the two or more users and the additional user, and in association with the destination MPDM communication, an affordance that permits the at least one user to invite one or more other users not previously associated with the destination MPDM communication to join the destination MPDM communication.

3. The method of claim 1, wherein the indication comprises at least one of:
a period of time of the DM communication;
a selection of one or more messages of the DM communication; or
a selection of one or more users of the DM communication.

4. The method of claim 1, further comprising:
determining that the indication of the portion of the conversation history data captures a message of a message thread but excludes a root message of the message thread; and
at least one of:
copying the message without the root message to the destination MPDM communication;
copying the message and the root message to the destination MPDM communication; or
refraining from copying the message and the root message to the destination MPDM communication.

5. The method of claim 1, wherein the indication to include the portion of the conversation history data captures at least one document posted in the DM communication, the method further comprising:
copying at least one document to the destination MPDM communication.

6. The method of claim 1, wherein copying the portion of the conversation history data from the first data structure associated with the DM communication to the second data structure associated with the destination MPDM communication further comprises:

interleaving the portion of the conversation history data into messages of the destination MPDM communication based at least in part on a time stamp associated with a root message of a message thread.

7. The method of claim 1, wherein the conversation history data is associated with at least one of author attribution data or encryption data, the method further comprising:

refraining from changing the at least one of the author attribution data or the encryption data in connection with copying the portion of the conversation history data to the destination MPDM communication.

8. One or more non-transitory computer-readable media comprising instructions that, when executed by one or more processors, cause the one or more processors to perform operations comprising:

receiving, in association with a direct message (DM) communication between two or more users of a communication platform, a first request to add a new user to the DM communication, wherein the DM communication is a first private communication that is not discoverable to other users of the communication platform;

sending, to a user computing device associated with a user of the two or more users, a second request to (i) identify an additional user not previously associated with the DM communication and (ii) designate whether to include conversation history data associated with the DM communication in a multi-party DM (MPDM) communication;

based at least in part on receiving (i) an identifier associated with the additional user and (ii) an indication to include a portion of the conversation history data associated with the DM communication in the MPDM communication, creating a destination MPDM communication between the two or more users and the additional user; and copying, based at least in part on the indication, the portion of the conversation history data from a first data structure associated with the DM communication to a second data structure associated with the destination MPDM communication, wherein the two or more users and the additional user are associated with the destination MPDM communication, and wherein the MPDM communication is a second private communication that is not discoverable to other users of the communication platform, wherein the first data structure and the second data structure exist in parallel.

9. The one or more non-transitory computer-readable media of claim 8, the operations further comprising:

displaying, via at least one user computing device associated with at least one user of the two or more users and the additional user, and in association with the destination MPDM communication, an affordance that permits the at least one user to invite one or more other users not previously associated with the destination MPDM communication to join the destination MPDM communication.

10. The one or more non-transitory computer-readable media of claim 8, wherein the indication comprises at least one of:

a period of time of the DM communication;
a selection of one or more messages of the DM communication; or a selection of one or more users of the DM communication.

11. The one or more non-transitory computer-readable media of claim 8, the operations further comprising:

determining that the indication of the portion of the conversation history data captures a message of a message thread but excludes a root message of the message thread; and at least one of:

copying the message without the root message to the destination MPDM communication;
copying the message and the root message to the destination MPDM communication; or
refraining from copying the message and the root message to the destination MPDM communication.

12. The one or more non-transitory computer-readable media of claim 8, wherein copying the portion of the conversation history data from the first data structure associated with the DM communication to the second data structure associated with the destination MPDM communication further comprises:

interleaving the portion of the conversation history data into messages of the destination MPDM communication based at least in part on a time stamp associated with a root message of a message thread.

13. The one or more non-transitory computer-readable media of claim 8, wherein the conversation history data is associated with at least one of author attribution data or encryption data, the operations further comprising:

refraining from changing the at least one of the author attribution data or the encryption data in connection with copying the portion of the conversation history data to the destination MPDM communication.

14. The one or more non-transitory computer-readable media of claim 8, wherein the indication to include the portion of the conversation history data captures at least one document posted in the DM communication, the operations further comprising:

copying at least one document to the destination MPDM communication.

15. A system associated with a communication platform, wherein the system comprises:

one or more processors; and
one or more non-transitory computer-readable media comprising instructions that, when executed by the one or more processors, cause the system to perform operations comprising:

receiving, in association with a direct message (DM) communication between two or more users of the communication platform, a first request to add a new user to the DM communication, wherein the DM communication is a first private communication that is not discoverable to other users of the communication platform;

sending, to a user computing device associated with a user of the two or more users, a second request to (i) identify an additional user not previously associated with the DM communication and (ii) designate whether to include conversation history data associated with the DM communication in a multi-party DM (MPDM) communication;

based at least in part on receiving (i) an identifier associated with the additional user and (ii) an indication to include a portion of the conversation history data associated with the DM communication in the MPDM communication, creating a destination MPDM communication between the two or more users and the additional user; and copying, based at least in part on the indication, the portion of the conversation history data from a first data structure associated with the DM communication to a second data structure associated with the destination MPDM communication, wherein the two or more users and the additional user are associated with the destination MPDM communication, and wherein the MPDM communication is a second private communication that is not discoverable to other users of the communication platform wherein the first data structure and the second data structure exist in parallel.

16. The system of claim 15, the operations further comprising:

determining that the indication of the portion of the conversation history data captures a message of a message thread but excludes a root message of the message thread; and at least one of:
copying the message without the root message to the destination MPDM communication;
copying the message and the root message to the destination MPDM communication; or
refraining from copying the message and the root message to the destination MPDM communication.

17. The system of claim 15, wherein the indication to include the portion of the conversation history data captures at least one document posted in the DM communication, the operations further comprising:

copying at least one document to the destination MPDM communication.

18. The system of claim 15, wherein copying the portion of the conversation history data from the first data structure associated with the DM communication to the second data structure associated with the destination MPDM communication further comprises:

interleaving the portion of the conversation history data into messages of the destination MPDM communication based at least in part on a time stamp associated with a root message of a message thread.

19. The system of claim 15, the operations further comprising:

displaying, via at least one user computing device associated with at least one user of the two or more users and the additional user, and in association with the destination MPDM communication, an affordance that permits the at least one user to invite one or more other users not previously associated with the destination MPDM communication to join the destination MPDM communication.

20. The system of claim 15, wherein the indication comprises at least one of:

a period of time of the DM communication;

a selection of one or more messages of the DM communication; or a selection of one or more users of the DM communication.

\* \* \* \* \*